(12) United States Patent
Wang et al.

(10) Patent No.: US 12,430,372 B2
(45) Date of Patent: Sep. 30, 2025

(54) SEARCH METHOD, COMPUTING DEVICE AND STORAGE MEDIUM

(71) Applicant: BEIJING BAIDU NETCOM SCIENCE TECHNOLOGY CO., LTD., Beijing (CN)

(72) Inventors: Haifeng Wang, Beijing (CN); Hao Tian, Beijing (CN); Jing Liu, Beijing (CN); Hua Wu, Beijing (CN); Tian Wu, Beijing (CN); Yu Sun, Beijing (CN); Qiaoqiao She, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 408 days.

(21) Appl. No.: 18/052,143

(22) Filed: Nov. 2, 2022

(65) Prior Publication Data

US 2023/0147798 A1 May 11, 2023

(30) Foreign Application Priority Data

Nov. 5, 2021 (CN) .......................... 202111308789.3

(51) Int. Cl.
*G06F 17/00* (2019.01)
*G06F 16/334* (2025.01)
*G06F 40/30* (2020.01)

(52) U.S. Cl.
CPC .......... *G06F 16/3347* (2019.01); *G06F 40/30* (2020.01)

(58) Field of Classification Search
None
See application file for complete search history.

(56) References Cited

U.S. PATENT DOCUMENTS

| 10,824,658 | B2 * | 11/2020 | Bakis | G06F 40/35 |
| 11,475,053 | B1 * | 10/2022 | Das | G06F 16/3322 |
| 2018/0010790 | A1 | 1/2018 | Huang | |
| 2018/0107902 | A1 * | 4/2018 | Yang | G06N 3/084 |

(Continued)

FOREIGN PATENT DOCUMENTS

| CN | 108959613 A | 12/2018 |
| CN | 109844767 A | 6/2019 |
| CN | 111814058 A | 10/2020 |

(Continued)

OTHER PUBLICATIONS

First Office Action issued in the related application, JP application No. 2022-171955, mailed Jan. 9, 2024, 5 pages.

(Continued)

*Primary Examiner* — Satwant K Singh
(74) *Attorney, Agent, or Firm* — FisherBroyles, LLP

(57) ABSTRACT

A method is provided. The method includes converting a search request of a user into a first request semantic vector. The method further includes searching a search resource database for at least one first data semantic vector matched with the first request semantic vector, wherein the search resource database is constructed as a semantic vector space in which different types of data are converted into corresponding data semantic vectors, and the different types of data include at least texts, pictures and videos. The method further includes generating, based on the at least one first data semantic vector, a search result.

18 Claims, 12 Drawing Sheets

(56) References Cited

U.S. PATENT DOCUMENTS

2020/0234009 A1* 7/2020 Uchide ................. G06F 40/237
2022/0382763 A1* 12/2022 Sethi ..................... G06F 16/242

FOREIGN PATENT DOCUMENTS

| CN | 112035626 A | 12/2020 |
| CN | 112541110 A | 3/2021 |
| CN | 112948601 A | 6/2021 |
| JP | 2021051391 A | 4/2021 |
| JP | 2021103557 A | 7/2021 |
| JP | 2021108188 A | 7/2021 |
| JP | 2021166098 A | 10/2021 |
| WO | 2020226753 A1 | 11/2020 |

OTHER PUBLICATIONS

Wu, Xuesong, "Analysis and Research on User Intention of Short Text Based on Transfer Learning," issued Feb. 15, 2021, pp. 1-58.
First Office Action from related application, CN 202111308789.3, issued Aug. 30, 2022, 12 pages.
Notice of Allowance, counterpart JP application No. 2022-171955 mailing date: Nov. 12, 2024, 3 pages.

* cited by examiner

SEARCH METHOD, COMPUTING DEVICE AND STORAGE MEDIUM

CROSS REFERENCE TO RELATED APPLICATION

This application claims priority to Chinese patent application No. 202111308789.3 filed on Nov. 5, 2021, the contents of which are hereby incorporated by reference in their entirety for all purposes.

TECHNICAL FIELD

The present disclosure relates to the technical field of artificial intelligence, in particular to the technical field of intelligent search, and in particular to a search method, a computing device, and a computer-readable storage medium.

BACKGROUND

Artificial intelligence is a discipline that studies how to make computers simulate certain thinking processes and intelligent behaviors (such as learning, reasoning, thinking, and planning) of human beings. It has both hardware technology and software technology. The hardware technology of artificial intelligence generally includes sensors, dedicated artificial intelligence chips, cloud computing, distributed storage, big data processing, etc. The software technology of artificial intelligence mainly includes computer vision technology, speech recognition technology, natural language processing technology, machine learning/deep learning, big data processing technology, knowledge graph technology and other major directions.

Data search is one of the basic services in the Internet, and may provide search results that meet user demands based on a search request of a user.

Methods described in this section are not necessarily those previously envisaged or adopted. Unless otherwise specified, it should not be assumed that any method described in this section is considered the prior art simply because it is included in this section. Similarly, unless otherwise specified, the issues raised in this section should not be considered to have been universally acknowledged in any prior art.

SUMMARY

The present disclosure provides a search method, a computing device, and a computer-readable storage medium.

According to one aspect of the present disclosure, a search method is provided. The search method includes: converting a search request of a user into a first request semantic vector; searching a search resource database for at least one first data semantic vector matched with the first request semantic vector, wherein the search resource database is constructed as a semantic vector space in which different types of data are converted into corresponding data semantic vectors, and wherein the different types of data at least include texts, pictures and videos; and generating, based on the at least one first data semantic vector, a search result.

According to another aspect of the present disclosure, a computing device is provided. The computing device includes: one or more processors; and a memory storing one or more programs configured to be executed by the one or more processors, the one or more programs comprising instructions for performing operations comprising: converting a search request of a user into a first request semantic vector; searching a search resource database for at least one first data semantic vector matched with the first request semantic vector, wherein the search resource database is constructed as a semantic vector space in which different types of data are converted into corresponding data semantic vectors, and wherein the different types of data at least comprise texts, pictures and videos; and generating, based on the at least one first data semantic vector, a search result.

According to yet another aspect of the present disclosure, a non-transitory computer-readable storage medium is provided. The non-transitory computer-readable storage medium storing one or more programs comprising instructions that, when executed by one or more processors of a computing device, cause the computing device to perform operations comprising: converting a search request of a user into a first request semantic vector; searching a search resource database for at least one first data semantic vector matched with the first request semantic vector, wherein the search resource database is constructed as a semantic vector space in which different types of data are converted into corresponding data semantic vectors, and wherein the different types of data at least comprise texts, pictures and videos; and generating, based on the at least one first data semantic vector, a search result.

It should be understood that the content described in this part is not intended to identify key or important features of the embodiments of the present disclosure, nor is it configured to limit the scope of the present disclosure. Other features of the present disclosure will be easily understood by the following description.

BRIEF DESCRIPTION OF THE DRAWINGS

The accompanying drawings illustrate embodiments by way of example and constitute a part of the specification, and together with the written description of the specification serve to explain exemplary implementations of the embodiments. The illustrated embodiments are for illustrative purposes only and are not intended to limit the scope of the claims. Throughout the drawings, the same reference numerals refer to similar but not necessarily identical elements.

DETAILED DESCRIPTION OF THE EMBODIMENTS

Figure 1:
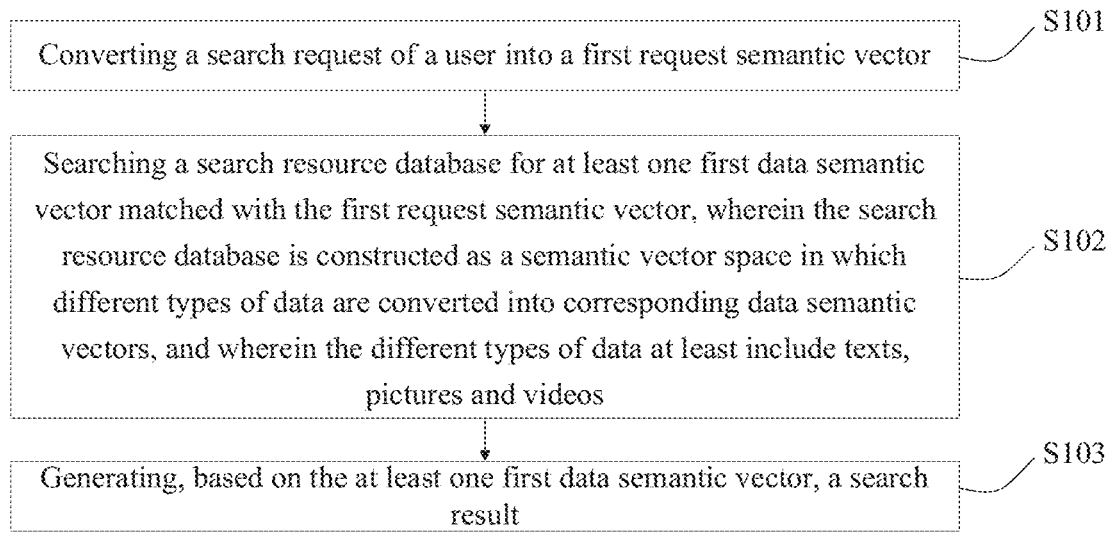
FIG. 1 shows a flow diagram of a search method according to some embodiments of the present disclosure.

The exemplary embodiments of the present disclosure are described below in combination with the accompanying drawings, including various details of the embodiments of the present disclosure to facilitate understanding, which should be considered merely exemplary. Therefore, those of ordinary skill in the art should recognize that various changes and modifications may be made to the embodiments described herein without departing from the scope of the present disclosure. Similarly, for clarity and conciseness, the description of well-known functions and structures is omitted from the following description.

In the present disclosure, unless otherwise specified, the terms "first", "second" and the like are configured to describe various elements and are not intended to limit the positional relationship, temporal relationship or importance relationship of these elements. These terms are only configured to distinguish one element from another element. In some examples, a first element and a second element may point to the same instance of the element, and in some cases, based on the context description, they can also refer to different instances.

The terms used in the description of the various examples in the present disclosure are only for the purpose of describing specific examples and are not intended to be limiting. Unless the context clearly indicates otherwise, if the number of elements is not specifically limited, the element may be one or more. In addition, the term "and/or" as used in the present disclosure covers any and all possible combinations of the listed items.

Data search is one of the basic services in the Internet, and may provide search results that meet user demands based on a search request of a user.

The inventors creatively proposed a search method for data, which concentrates various forms of network resources including texts, pictures, videos, tables, etc. in a unified resource database in a unified vector expression, so as to convert different types of data into corresponding data semantic vectors. Therefore, by comparing a semantic vector corresponding to the search request of the user with semantic vectors corresponding to at least one datum, a search result for the search request of the user may be recalled from the at least one datum. Therefore, by mapping different types of data to the same semantic vector space, similarity matching may be performed on semantic vectors corresponding to the different types of data directly, and multi-modal data matched with the search request of the user may be obtained, which is beneficial to improving the search performance, and specifically to improving the diversity of retrieval content and user experience.

The attributes of data include at least one of the following: modality, language, or data structure. The modality of data includes texts, pictures and videos. The language of data includes various types of languages, such as Chinese and English. The data structure includes structured data (such as tables and graphs) and unstructured data. Therefore, the solutions of the embodiments of the present application may implement a multi-modal, multi-language, and multi-resource unified search method.

The embodiments of the present disclosure will be described in detail below in combination with the accompanying drawings.

FIG. 1 shows a flow diagram of a search method according to some embodiments of the present disclosure.

As shown in FIG. 1, the method may include: step S101, a search request of a user is converted into a first request semantic vector; step S102, a search resource database is searched for at least one first data semantic vector matched with the first request semantic vector, where the search resource database is constructed as a semantic vector space in which different types of data are converted into corresponding data semantic vectors, and where the different types of data at least include texts, pictures and videos; and step S103, a search result is generated based on the at least one first data semantic vector. Thus, unified retrieval of different types of data may be achieved, the diversity of search results may be improved, and the user experience may be improved.

Exemplarily, the search resource database includes a large quantity of texts, pictures, videos and other different types of data. The different types of data may be obtained in various ways, such as accessing an existing database with standardized data content, where the data content is converted into corresponding data semantic vectors in the semantic vector space of the search resource database.

The search request of the user at least includes search information input by the user, and the search information may be, but not limited to, text information or voice information. Data that meet the requirements of the user are obtained by extracting semantic features of the search information and converting the semantic features into the first request semantic vector for matching search.

According to some embodiments, in the search resource database, the data semantic vectors converted from the different types of data have a uniform specification. Thus, unified retrieval of different types of data may be achieved.

It can be understood that the first request semantic vector has the same specification as data semantic vectors in the search resource database. For example, when the data semantic vectors in the search resource database are 1000-dimensional vectors, the search request should also be converted to the same specification, namely, a 1000-dimensional vector. Exemplarily, the similarity between the first request semantic vector and each data semantic vector in the search resource database may be calculated, and at least one first data semantic vector matched with the first request semantic vector is obtained based on the similarity. Based on the at least one first data semantic vector, first data corresponding to each first data semantic vector may be obtained, and then a search result may be generated based on the at least one first data and displayed to the user. The similarity between vectors may be, for example, but not limited to, cosine similarity.

According to some embodiments, in addition to the texts, pictures and videos, the different types of data at least include tables and knowledge graphs. It can be understood that the different types of data may further include other types of data, such as maps and animations. The search resource database may be further enriched by more types of data, thereby further improving the diversity of search results, better meeting user demands, and improving user experience.

According to some embodiments, at least one text or video datum among the different types of data is obtained by performing fine-grained division on original complete data. Thus, a deeper understanding of data content may be achieved, and then fine-grained indexing may be achieved to obtain search results that are more in line with user demands.

Exemplarily, obtaining at least one text or video datum by performing fine-grained division on the original complete data may be to perform fine-grained division on the original complete data according to semantics. In some embodiments, the fine-grained division of the original complete data may include semantic segmentation of the original complete data to obtain at least one text or video datum. Taking webpage text data as an example, original complete webpage text data may include a plurality of paragraphs, and each paragraph may have different semantic features, such that data semantic vectors corresponding to the complete web text data may not fully express different semantic features of each paragraph, which makes it impossible to match the first request semantic vector reflecting the user demands with the semantics of each paragraph in the search process. By dividing the original complete webpage text data, the data may be divided into a plurality of segments with different semantic features, and each segment corresponds to one of the at least one text. Each segment is converted into a corresponding data semantic vector, such that each segment may be subjected to matching with the first request semantic vector reflecting the user demands in the search process to obtain a search result that better meets the user demands. Similarly, fine-grained division may be performed based on video text data corresponding to a video, and the specific principle and process are similar to the webpage text data.

According to some embodiments, each data semantic vector in the semantic vector space includes a dimension relevant to content quality of respective data. The dimension relevant to the content quality of the respective data may be, but not limited to, a content quality score of the respective data. Thus, the quality of the search result may be improved by considering the content quality of data in the search process.

According to some embodiments, each data semantic vector in the semantic vector space includes a dimension relevant to publishing time of the respective data. The dimension relevant to the publishing time of the respective data may be, but not limited to, publishing time of the respective data. Thus, the quality of the search result may be improved by considering the timeliness of data in the search process.

According to some embodiments, each data semantic vector in the semantic vector space includes a dimension relevant to source credibility of the respective data. The dimension relevant to the source credibility of the respective data may be, but not limited to, the type of a source website of the respective data and credibility corresponding to the website type. Thus, the quality of the search result may be improved by considering the authority of data in the search process.

According to some embodiments, each data semantic vector in the semantic vector space includes at least two of the following dimensions of respective data: the dimension relevant to the content quality, the dimension relevant to the publishing time, and the dimension relevant to the source credibility. In the search process, the quality of the search result may be further improved by adding dimensions of data.

Based on the same principle, according to some embodiments, the first request semantic vector includes contextual information relevant to a search of the user, and the contextual information includes at least one of time, location, a terminal device, or a preceding search of the user. Thus, the accuracy of the search may be further improved.

It can be understood that direct search demands of the user may be described more accurately according to the contextual information relevant to the search of the user. For example, when the search information input by the user is "how is the weather tomorrow", the first request semantic vector may correspondingly include the location of the user, for example. Beijing, so as to provide the user with a relevant search result about "the weather in Beijing tomorrow", thereby meeting the user demands more accurately and improving user experience.

The inventors found through research that after a user queries one search request, the user may continue to query another relevant search request which may reflect a relevant search intention of the user when querying the first search request. For example, the user queries "who is the wife of public figure A", and based on a search result "the wife of public figure A is public figure B", the user may continue to query "where is public figure B from". Therefore, if the relevant search intention of the user is further mined when the search request of the user is queried, it may be beneficial to improving the search performance.

Figure 2:
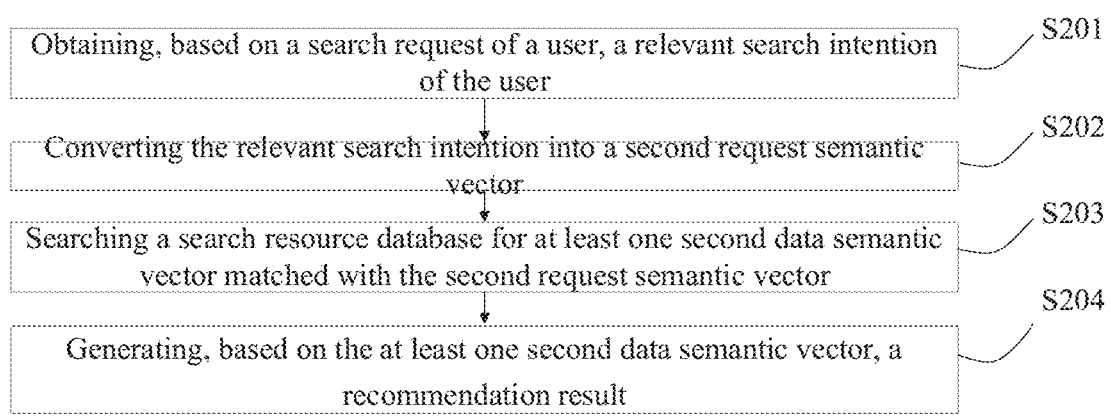
FIG. 2 shows a flow diagram of a search method according to some embodiments of the present disclosure.

Based on this, according to some embodiments, as shown in FIG. 2, the search method further includes: step S201, the relevant search intention of the user is obtained based on the search request of the user; step S202, the relevant search intention is converted into a second request semantic vector; step S203, the search resource database is searched for at least one second data semantic vector matched with the second request semantic vector; and step S204, a recommendation result is generated based on the at least one second data semantic vector. Thus, in response to the search request of the user, a query result for the search request input by the user may further meet extended demands of the user by obtaining the relevant search intention of the user and making recommendations based on the relevant search intention, thereby further improving the user experience. There may be one or more relevant search intentions.

According to some embodiments, obtaining the relevant search intention of the user includes: obtaining, based on a demand graph, the relevant search intention of the user. The demand graph includes search demand distribution information, search demand related information, etc. obtained based on big data. Thus, the relevant search intention of the user may be obtained more accurately based on the direct search intention of the user.

For example, the relevant search intention of the user may be obtained by searching for high-frequency search demands associated with the search request of the user according to the search request of the user. In an example, a current search request input by the user is "how to get to scenic spot A", since it is found via the demand graph that high-frequency search demands associated with "scenic spot A" are "booking method for scenic spot A", "tour map of scenic spot A", etc., the relevant search intention of the user may be correspondingly obtained as "preparations for visiting scenic spot A", and ticket booking, tourist guide, etc. of scenic spot A may be recommended to the user. Therefore, the relevant search intention of the user may also be understood as a potential search intention of the user.

According to other embodiments, obtaining the relevant search intention of the user includes: obtaining, based on a search history of the user in the same session process, the relevant search intention of the user. Thus, the relevant search intention of the user may be obtained in a more targeted manner based on the search history of the user.

For example, when the search request input by the user is "how to get to scenic spot A", and according to the search history of the user, it is found that the search history of the user in the session process includes historical search information such as "how to get to scenic spot B" and "how to get to scenic spot C", it may be concluded that the relevant search intention of the user is "finding a sightseeing spot in a certain place" by performing semantic analysis on the historical search information, and thus other tourist attractions in the place may be recommended to the user.

The above two concrete embodiments are merely configured to describe how to obtain the relevant search intention of the user, and are not intended to limit manners of obtaining the relevant search intention of the user. For example, the relevant search intention of the user may also be obtained based on a relationship graph of the user.

For another example, the relevant search intention of the user may be obtained by performing structured analysis on the search request of the user. Structured analysis may be implemented, for example, based on an intention graph of the user. Referring to an example in FIG. 6, the search information input by the user is "hairstyle", the intention graph of the user is obtained by obtaining a search log of the user correspondingly and mining and modeling the search log, and comprehensive computer reasoning is performed in combination with an analysis result of the search request, so as to obtain the relevant search intention of the user. Content matched with the relevant search intention of the user in various fields are recommend to the user based on the relevant search intention, such as "haircuts with good-looking haircuts" in the field of beauty and fashion, "automatic haircuts" in the field of goods and commodities, and "hairdressing training" in the field of education and training.

After the relevant search intention corresponding to the search request of the user is determined, steps S202 to S204 are performed, that is, the search resource database is searched for at least one second data semantic vector matched with the second request semantic vector corresponding to the relevant search intention, and the recommendation result is generated based on the at least one second data semantic vector.

According to some embodiments, each second data semantic vector in the at least one second data semantic vector includes dimensions relevant to a semantic relevance feature and a perception relevance feature of the respective data respectively. The semantic relevance feature is configured to describe direct semantics of the respective data, and the perception relevance feature focuses on dimensions relevant to user demands and interests, thereby further improving the accuracy of a recommendation system and better meeting potential demands of the user.

Correspondingly, according to some embodiments, the second request semantic vector includes dimensions relevant to a semantic relevance feature and a perception relevance feature of the search request respectively. The semantic relevance feature is configured to describe direct semantics of the search request, and the perception relevance feature focuses on dimensions relevant to user demands and interests, thereby further improving the accuracy of the recommendation system and better meeting potential demands of the user.

For example, the semantic relevance feature dimension in a data semantic vector corresponding to a webpage containing the introduction of public figure A is configured to describe direct semantics of content of the webpage. The perception relevance feature dimension in the data semantic vector corresponding to the webpage focuses on describing possible extended interests of the user around public figure A. For example, the user may be interested in who the wife of public figure A is, what works public figure A has, etc., and corresponding content may be included in the perception relevance feature dimension. Thus, the accuracy of the recommendation system may be further improved, and the potential demands of the user may be better met.

According to some embodiments, a plurality of first data semantic vectors configured to recall the search request of the user and a plurality of second data semantic vectors configured to recall the relevant search intention of the user may be completely identical, or partially identical, or completely different. That is, a plurality of first data corresponding to the plurality of first data semantic vectors and a plurality of second data corresponding to the plurality of second data semantic vectors may be completely identical, or partially identical, or completely different. The one or more first data matched with the search request of the user are obtained by recalling from the plurality of first data, and the one or more second data matched with the relevant search intention of the user are obtained by recalling from the plurality of second data.

In some embodiments, the amount of the plurality of second data is smaller than the amount of the plurality of first data, thereby achieving accurate recommendation, improving a recommendation effect, and further improving the user experience.

According to some embodiments, the search resource database includes a first sub-base, and a second sub-base only used for the relevant search intention, and an amount of data in the second sub-base is smaller than an amount of data in the first sub-base. By setting the two sub-bases, search and recommendation may be more pertinent. The first sub-base is configured to meet a large number of recall demands for relevance searches, and the second sub-base is configured to meet accurate recall demands of potential demands of the user. Thus, the quality of query results may be better improved, and the user experience may be further improved.

Exemplarily, the amount of data in the first sub-base may be in the order of tens of billions or hundreds of billions, so that more content resources may be covered, and content demands of the user may be more comprehensively covered. Correspondingly, the amount of data in the second sub-base may be in the order of millions.

It can be understood that the data in the second sub-base used for recommendation may be selected according to a predetermined quality standard, so as to provide users with higher-quality recommended content, better meet extended demands of the user, and improve user experience.

Exemplarily, the similarity between the second request semantic vector and each second data semantic vector in the search resource database may be calculated, and the at least one second data semantic vector matched with the second request semantic vector is obtained based on the similarity. Based on the at least one second data semantic vector, second data corresponding to each second data semantic vector may be obtained, and thus the recommendation result may be generated based on the at least one second data and displayed to the user.

In the above technical solution, the search result can be generated in response to the search request of the user, and the recommendation result can be generated by determining the relevant search intention of the user, such that the direct demands of the user can be accurately met, and at the same time, the vision can be expanded to meet the extended demands of the user.

Figure 3:
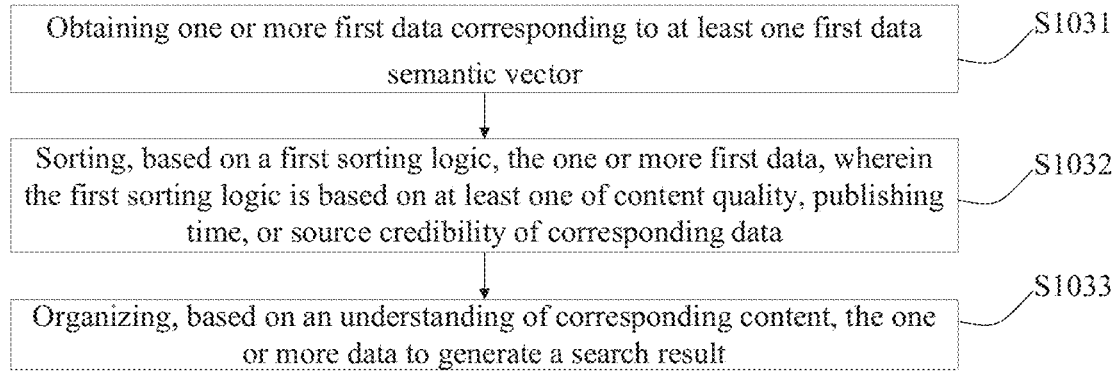
FIG. 3 shows a flow diagram of a search method according to some embodiments of the present disclosure.

According to some embodiments, as shown in FIG. 3, step S103, that is, the search result is generated based on the at least one first data semantic vector, includes: step S1031, one or more first data corresponding to the at least one first data semantic vector are obtained; and step S1032, the one or more first data are sorted based on a first sorting logic. The first sorting logic is based on at least one of the content quality, publishing time, or source credibility of the respective data. Thus, search results more in line with the user demands may be generated by focusing more on the relevance between the search result and the search request, and the user experience is improved.

Figure 4:
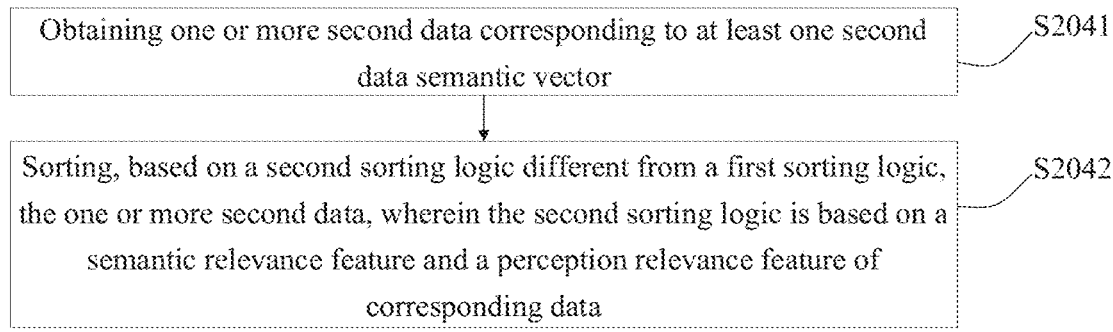
FIG. 4 shows a flow diagram of a search method according to some embodiments of the present disclosure.

According to some embodiments, as shown in FIG. 4, step S204, that is, the recommendation result is generated based on the at least one second data semantic vector, includes: step S2041, one or more second data corresponding to the at least one second data semantic vector are obtained; and step S2042, the one or more second data are sorted based on a second sorting logic different from the first sorting logic. The second sorting logic is based on the semantic relevance feature and the perception relevance feature of the respective data. Thus, the recommendation result may be obtained by focusing more on the perception and interests of the user, thereby generating a recommendation result that focuses more on the perception of potential demands, and improving the user experience.

In the above two embodiments, the search result and the recommendation result are generated based on the different sorting logics. The first sorting logic focuses more on the semantic relevance, content quality, source reliability, etc. of data, and can obtain the search result that is more relevant to the direct search request of the user. Correspondingly, the second sorting logic focuses more on the perception of the potential demands of the user, and can obtain the recommendation result that is more in line with the perception and interests of the user. It can be understood that by using the two different sorting logics to generate the search result and the recommendation result respectively, the direct search demand and potential search demand of the user can be better met, and the user experience can be improved.

According to some embodiments, as shown in FIG. 3, step S103, that is, the search result is generated based on the at least one first data semantic vector, includes: step S1033, one or more corresponding data are determined according to the at least one first data semantic vector; and the search result is generated by organizing, based on an understanding of corresponding content, the one or more data. Thus, the search result may be simplified to meet the user demands more accurately.

For example, when the search request input by the user is "food near scenic spot A", and the one or more data include "menu of food B near scenic spot A", "business hours and address of food B near scenic spot A", "menu of food C near scenic spot A", "address of food C near scenic spot A", etc., the plurality of data above may be organized into "menu, business hours and address of food B near scenic spot A" and "menu and address of food C near scenic spot A" based on the understanding of the corresponding content, and displayed to the user, so as to provide the user with the search result that is more in line with the demands of the user, and improve user experience.

It can be understood that manners of organizing the one or more data is not limited to the simple stacking manner in the above example, and an appropriate organization manner may be designed according to specific application scenarios. For example, when the one or more data are text segments, the one or more data may be semantically understood, and a recommendation result is generated based on a semantic understanding result. For example, a text segment is configured to describe weather conditions of a certain place, including temperature, humidity, sunshine intensity, etc., and a recommendation result of "the place is suitable for outdoor activities" may be generated based on semantic understanding of the text segment.

Figure 5:
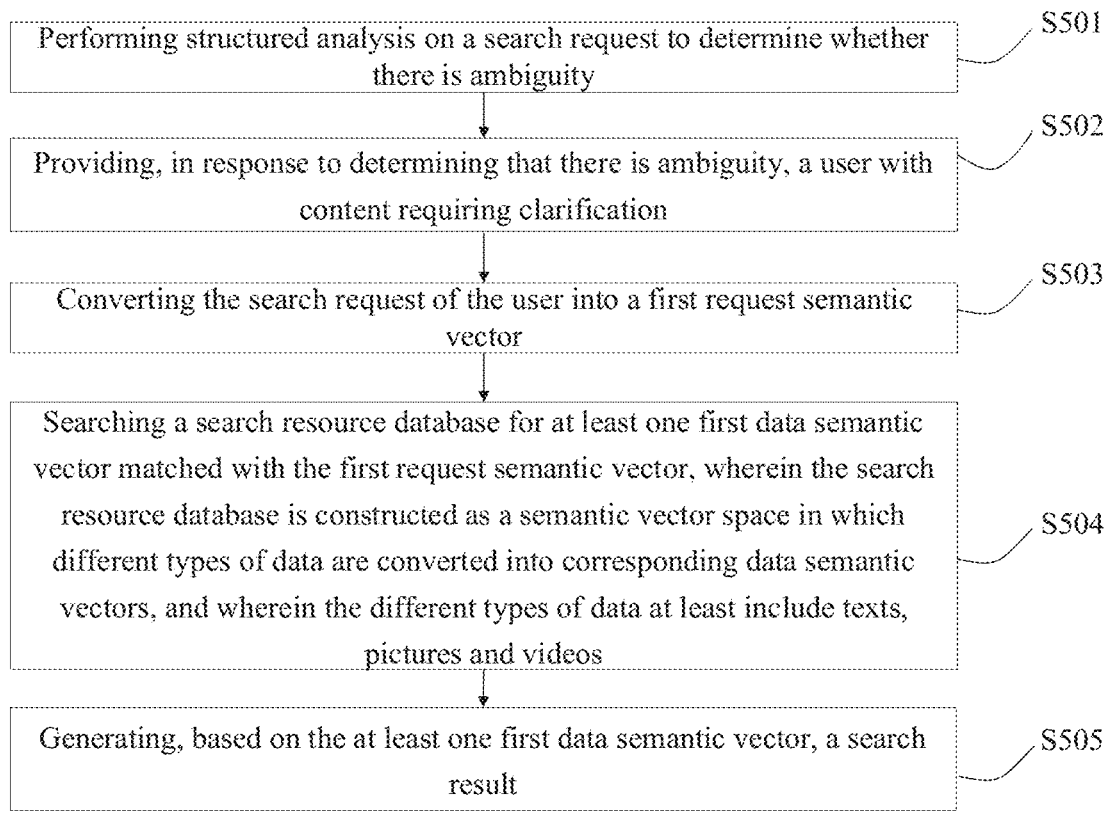
FIG. 5 shows a flow diagram of a search method according to some embodiments of the present disclosure.

According to some embodiments, as shown in FIG. 5, the search method includes: step S501, structured analysis is performed on the search request to determine whether there is ambiguity; and step S502, in response to determining that there is ambiguity, content requiring clarification is provided for the user. The functions and implementations of steps S503 to S505 are the same as those of steps S101 to S103 in FIG. 1, and will not be described in detail here. Thus, clarification of the search request of the user and guidance of the user demands may be achieved.

Whether the search request is clear and has no ambiguity may be determined by performing structured analysis on the search request. Structured analysis may be implemented, for example, based on knowledge graphs.

Figure 6:
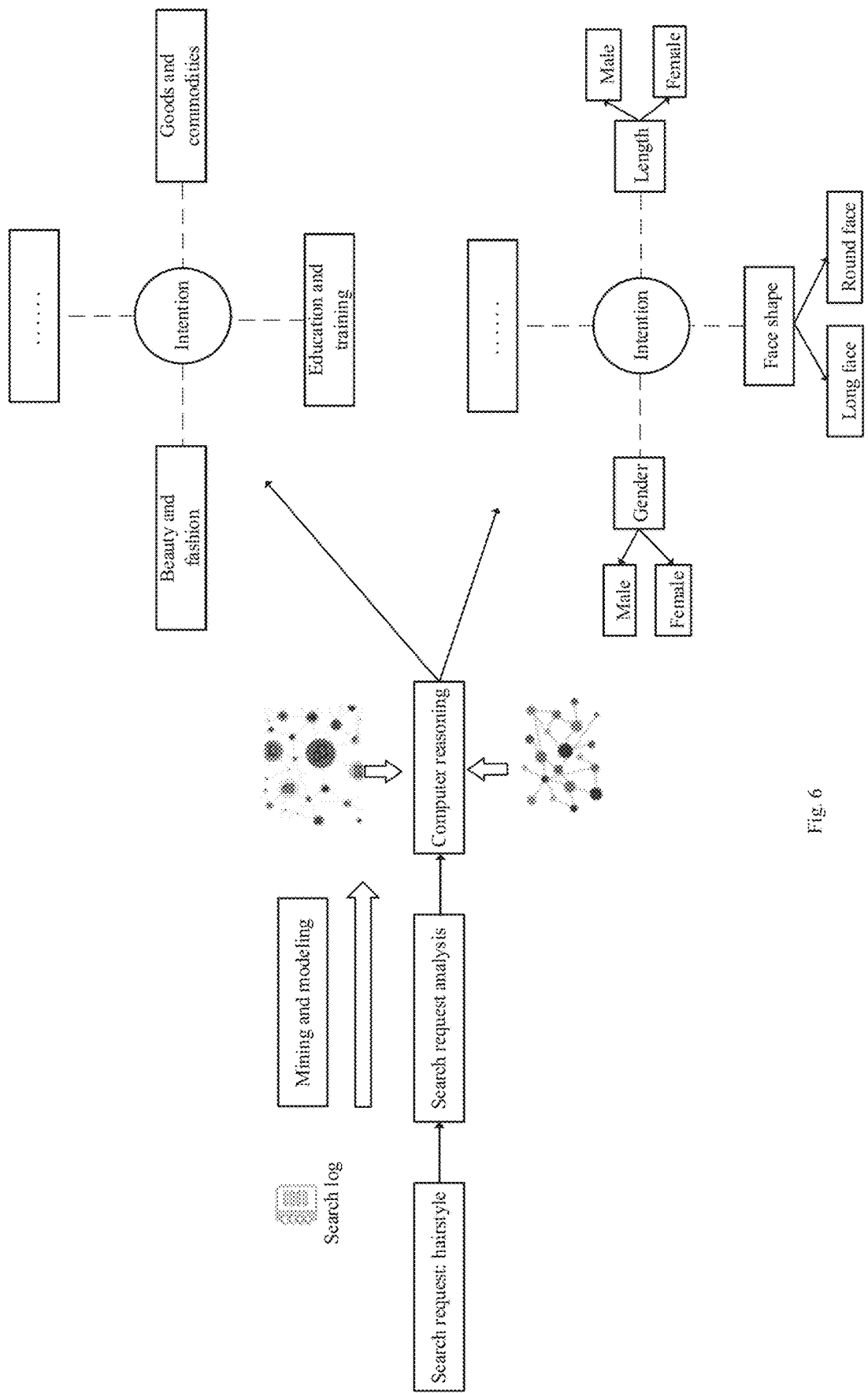
FIG. 6 shows a schematic diagram of structured analysis of search requests according to some embodiments of the present disclosure.

Continuing to refer to the example in FIG. 6, structured analysis is performed on the search information "hairstyle" input by the user, and comprehensive computer reasoning is performed in combination with a knowledge graph based on big data, so as to obtain the content requiring clarification for the user. It can be concluded that the "hairstyle" input by the user may have ambiguities from multiple angles, such as male hairstyle or female hairstyle, short hairstyle or long hairstyle, hairstyle for a long face or hairstyle for a round face, etc. By providing the user with the content requiring clarification, the user demands may be further determined and guided.

In the technical solutions of the present disclosure, the collection, storage, use, processing, transmission, provision, and disclosure of involved personal information of the user are all in compliance with relevant laws and regulations, and do not violate public order and good customs.

Figure 7:
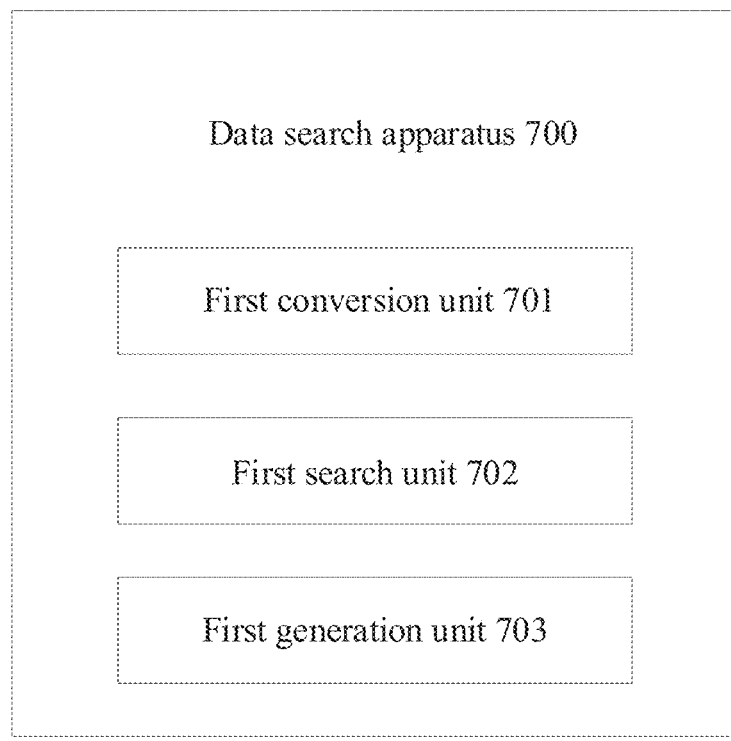
FIG. 7 shows a structural block diagram of a data search apparatus according to some embodiments of the present disclosure.

According to another aspect of the present disclosure, a data search apparatus is provided. Referring to FIG. 7, the apparatus includes: a first conversion unit 701 configured to convert a search request of a user into a first request semantic vector; a first search unit 702 configured to search a search resource database for at least one first data semantic vector matched with the first request semantic vector, where the search resource database is constructed as a semantic vector space in which different types of data are converted into corresponding data semantic vectors, and where the different types of data at least include texts, pictures and videos; and a first generation unit 703 configured to generate, based on the at least one first data semantic vector, a search result. Thus, unified retrieval of data of different types and different structures may be achieved, the diversity of search results may be improved, and user experience may be improved.

Exemplarily, the search resource database includes a large quantity of texts, pictures, videos and other different types of data. The different types of data may be obtained in various ways, such as accessing an existing database with standardized data content, where the data content is converted into corresponding data semantic vectors in the semantic vector space of the search resource database.

The search request of the user at least includes search information input by the user, and the search information may be, but not limited to, text information or voice information. Data that meet the requirements of the user are obtained by extracting semantic features of the search information and converting the semantic features into the first request semantic vector for matching search.

According to some embodiments, in the search resource database, the data semantic vectors converted from the different types of data have a uniform specification. Thus, unified retrieval of different types of data may be achieved.

It can be understood that the first request semantic vector has the same specification as data semantic vectors in the search resource database. For example, when the data semantic vectors in the search resource database are 1000-dimensional vectors, the search request should also be converted to the same specification, namely, a 1000-dimensional vector in the same mapping manner. Exemplarily, the similarity between the first request semantic vector and each data semantic vector in the search resource database may be calculated, and at least one first data semantic vector matched with the first request semantic vector is obtained based on the similarity. Based on the at least one first data semantic vector, first data corresponding to each first data semantic vector may be obtained, and then a search result may be generated based on the at least one first data and displayed to the user. The similarity between vectors may be, for example, but not limited to, cosine similarity.

According to some embodiments, in addition to the texts, pictures and videos, the different types of data at least include tables and knowledge graphs. It can be understood that the different types of data may further include other types of data, such as maps and animations. The search resource database may be further enriched by more types of data, thereby further improving the diversity of search results, better meeting user demands, and improving user experience.

According to some embodiments, at least one text or video datum among the different types of data is obtained by performing fine-grained division on original complete data. Thus, a deeper understanding of data content may be achieved, and then fine-grained indexing may be achieved to obtain search results that are more in line with user demands.

Exemplarily, obtaining at least one text or video datum by performing fine-grained division on the original complete data may be to perform fine-grained division on the original complete data according to semantics. In some embodiments, the fine-grained division of the original complete data may include semantic segmentation of the original complete data to obtain at least one text or video datum. Taking webpage text data as an example, original complete webpage text data may include a plurality of paragraphs, and each paragraph may have different semantic features, such that data semantic vectors corresponding to the complete web text data may not fully express different semantic features of each paragraph, which makes it impossible to match the first request semantic vector reflecting the user demands with the semantics of each paragraph in the search process. By dividing the original complete webpage text data, the data may be divided into a plurality of segments with different semantic features, and each segment corresponds to one of the at least one text. Each segment is converted into a corresponding data semantic vector, such that each segment may be subjected to matching with the first request semantic vector reflecting the user demands in the search process to obtain a search result that better meets the user demands. Similarly, fine-grained division may be performed based on video text data corresponding to a video, and the specific principle and process are similar to the webpage text data.

According to some embodiments, each data semantic vector in the semantic vector space includes a dimension relevant to content quality of respective data. The dimension relevant to the content quality of the respective data may be, but not limited to, a content quality score of the respective data. Thus, the quality of the search result may be improved by considering the content quality of data in the search process.

According to some embodiments, each data semantic vector in the semantic vector space includes a dimension relevant to publishing time of the respective data. The dimension relevant to the publishing time of the respective data may be, but not limited to, publishing time of the respective data. Thus, the quality of the search result may be improved by considering the timeliness of data in the search process.

According to some embodiments, each data semantic vector in the semantic vector space includes a dimension relevant to source credibility of the respective data. The dimension relevant to the source credibility of the respective data may be, but not limited to, the type of a source website of the respective data and credibility corresponding to the website type. Thus, the quality of the search result may be improved by considering the authority of data in the search process.

According to some embodiments, each data semantic vector in the semantic vector space includes at least two of the following dimensions of respective data: the dimension relevant to the content quality, the dimension relevant to the publishing time, and the dimension relevant to the source credibility. In the search process, the quality of the search result may be further improved by adding dimensions of data.

Based on the same principle, according to some embodiments, the first request semantic vector includes contextual information relevant to a search of the user, and the contextual information includes at least one of time, location, a terminal device, or a preceding search of the user. Thus, the accuracy of the search may be further improved.

It can be understood that direct search demands of the user may be described more accurately according to the contextual information relevant to the search of the user. For example, when the search information input by the user is "how is the weather tomorrow", the first request semantic vector may correspondingly include the location of the user, for example, Beijing, so as to provide the user with a relevant search result about "the weather in Beijing tomorrow", thereby meeting the user demands more accurately and improving user experience.

The inventors found through research that after a user queries one search request, the user may continue to query another relevant search request which may reflect a relevant search intention of the user when querying the first search request. For example, the user queries "who is the wife of public figure A", and based on a search result "the wife of public figure A is public figure B", the user may continue to query "where is public figure B from". Therefore, if the relevant search intention of the user is further mined when the search request of the user is queried, it may be beneficial to improving the search performance.

Figure 8:
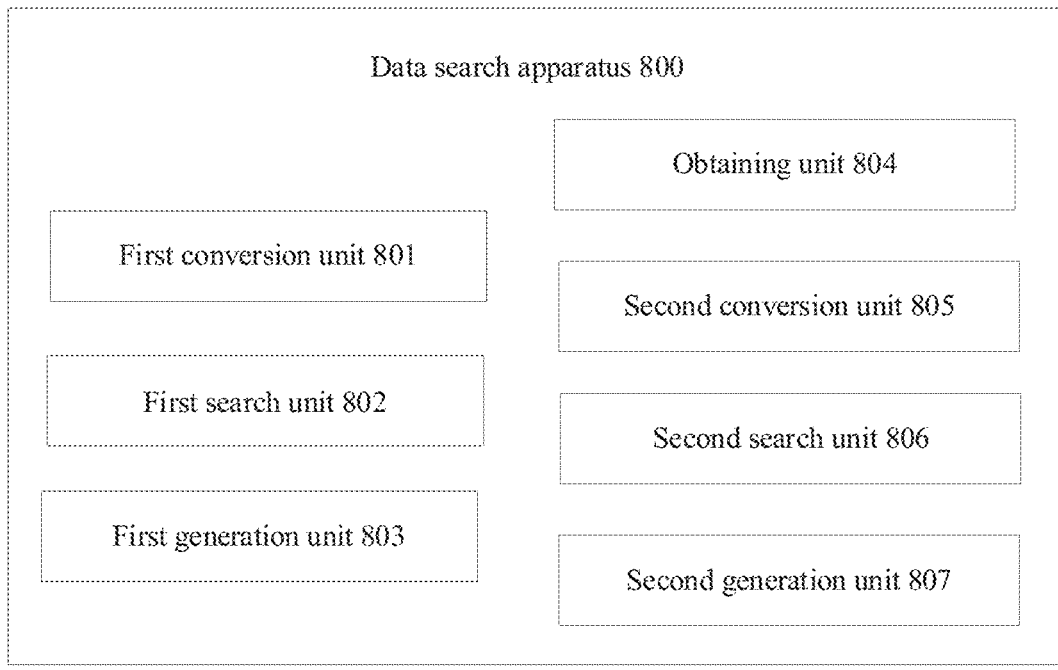
FIG. 8 shows a structural block diagram of a data search apparatus according to some embodiments of the present disclosure.

Based on this, according to some embodiments, as shown in FIG. 8, the data search apparatus further includes: an obtaining unit 804 configured to obtain, based on the search request of the user, a relevant search intention of the user; a second conversion unit 805 configured to convert the relevant search intention into a second request semantic vector; a second search unit 806 configured to search the search resource database for at least one second data semantic vector matched with the second request semantic vector; and a second generation unit 807 configured to generate, based on the at least one second data semantic vector, a recommendation result. The functions and implementations of the units 801 to 803 in FIG. 8 are the same as those of the units 701 to 703 in FIG. 7, and will not be described in detail here. Thus, in response to the search request of the user, a query result for the search request input by the user may further meet extended demands of the user by obtaining the relevant search intention of the user and making recommendations based on the relevant search intention, thereby further improving the user experience. There may be one or more relevant search intentions.

According to some embodiments, the unit configured to obtain, based on the search request of the user, the relevant search intention of the user is further configured to: obtain, based on a demand graph, the relevant search intention of the user. The demand graph includes search demand distribution information, search demand associated information, etc. obtained based on big data. Thus, the relevant search intention of the user may be obtained more accurately.

For example, the relevant search intention of the user may be obtained by searching for high-frequency search demands associated with the search request of the user according to the search request of the user. In an example, a current search request input by the user is "how to get to scenic spot A", since it is found via the demand graph that high-frequency search demands associated with "scenic spot A" are "booking method for scenic spot A", "tour map of scenic spot A", etc., the relevant search intention of the user may be correspondingly obtained as "preparations for visiting scenic spot A", and ticket booking, tourist guide, etc. of scenic spot A may be recommended to the user.

According to some embodiments, the unit configured to obtain, based on the search request of the user, the relevant search intention of the user is further configured to: obtain, based on a search history of the user in the same session process, the relevant search intention of the user. Thus, the relevant search intention of the user may be obtained in a more targeted manner based on the search history of the user.

For example, when the search request input by the user is "how to get to scenic spot A", and according to the search history of the user, it is found that the search history of the user in the session process includes historical search information such as "how to get to scenic spot B" and "how to get to scenic spot C", it may be concluded that the relevant search intention of the user is "finding a sightseeing spot in a certain place" by performing semantic analysis on the historical search information, and thus other tourist attractions in the place may be recommended to the user.

The above two concrete embodiments are merely configured to describe how to obtain the relevant search intention of the user, and are not intended to limit manners of obtaining the relevant search intention of the user. For example, the relevant search intention of the user may also be obtained based on a relationship graph of the user.

For another example, the relevant search intention of the user may be obtained by performing structured analysis on the search request of the user. Structured analysis may be implemented, for example, based on an intention graph of the user. Referring to an example in FIG. 6, for example, the search information input by the user is "hairstyle", the intention graph of the user is obtained by obtaining a search log of the user correspondingly and mining and modeling the search log, and comprehensive computer reasoning is performed in combination with an analysis result of the search request, so as to obtain the relevant search intention of the user. Content matched with the relevant search intention of the user in various fields are recommend to the user based on the relevant search intention, such as "haircuts with good-looking haircuts" in the field of beauty and fashion, "automatic haircuts" in the field of goods and commodities, and "hairdressing training" in the field of education and training.

After the relevant search intention corresponding to the search request of the user is determined, steps S202 to S204 are performed, that is, the search resource database is searched for at least one second data semantic vector matched with the second request semantic vector corresponding to the relevant search intention, and the recommendation result is generated based on the at least one second data semantic vector.

According to some embodiments, each second data semantic vector in the at least one second data semantic vector includes dimensions relevant to the semantic relevance feature and the perception relevance feature of the respective data respectively. The semantic relevance feature is configured to describe direct semantics of the respective data, and the perception relevance feature focuses on dimensions relevant to user demands and interests, thereby further improving the accuracy of a recommendation system and better meeting potential demands of the user.

Correspondingly, according to some embodiments, the second request semantic vector includes dimensions relevant to a semantic relevance feature and a perception relevance feature of the search request respectively. The semantic relevance feature is configured to describe direct semantics of the respective data, and the perception relevance feature focuses on dimensions relevant to user demands and interests, thereby further improving the accuracy of a recommendation system and better meeting potential demands of the user.

For example, the semantic relevance feature dimension in a data semantic vector corresponding to a webpage containing the introduction of public figure A is configured to describe direct semantics of content of the webpage. The perception relevance feature dimension in the data semantic vector corresponding to the webpage focuses on describing possible extended interests of the user around public figure A. For example, the user may be interested in who the wife of public figure A is, what works public figure A has, etc., and corresponding content may be included in the perception relevance feature dimension. Thus, the accuracy of the recommendation system may be further improved, and the potential demands of the user may be better met.

According to some embodiments, a plurality of first data semantic vectors configured to recall the search request of the user and a plurality of second data semantic vectors configured to recall the relevant search intention of the user may be completely identical, or partially identical, or completely different. That is, a plurality of first data corresponding to the plurality of first data semantic vectors and a plurality of second data corresponding to the plurality of second data semantic vectors may be completely identical, or partially identical, or completely different. The one or more first data matched with the search request of the user are obtained by recalling from the plurality of first data, and the one or more second data matched with the relevant search intention of the user are obtained by recalling from the plurality of second data.

In some embodiments, the amount of the plurality of second data is smaller than the amount of the plurality of first data, thereby achieving accurate recommendation, improving a recommendation effect, and further improving the user experience.

According to some embodiments, the search resource database includes a first sub-base, and a second sub-base only used for the relevant search intention, and an amount of data in the second sub-base is smaller than an amount of data in the first sub-base. By setting the two sub-bases, search and recommendation may be more pertinent. The first sub-base is configured to meet a large number of recall demands for relevance searches, and the second sub-base is configured to meet accurate recall demands of potential demands of the user. Thus, the quality of query results may be better improved, and the user experience may be further improved.

Exemplarily, the amount of data in the first sub-base may be in the order of tens of billions or hundreds of billions, so that more content resources may be covered, and content demands of the user may be more comprehensively covered. Correspondingly, the amount of data in the second sub-base may be in the order of millions.

It can be understood that the data in the second sub-base used for recommendation may be selected according to a predetermined quality standard, so as to provide users with higher-quality recommended content, better meet extended demands of the user, and improve user experience.

Exemplarily, the similarity between the second request semantic vector and each data semantic vector in the search resource database may be calculated, and the at least one second data semantic vector matched with the second request semantic vector is obtained based on the similarity. Based on the at least one second data semantic vector, second data corresponding to each second data semantic vector may be obtained, and thus the recommendation result may be generated based on the at least one second data and displayed to the user.

In the above technical solution, the search result can be generated in response to the search request of the user, and the recommendation result can be generated by determining the relevant search intention of the user, such that the direct demands of the user can be accurately met, and at the same time, the vision can be expanded to meet the extended demands of the user.

Figure 9:
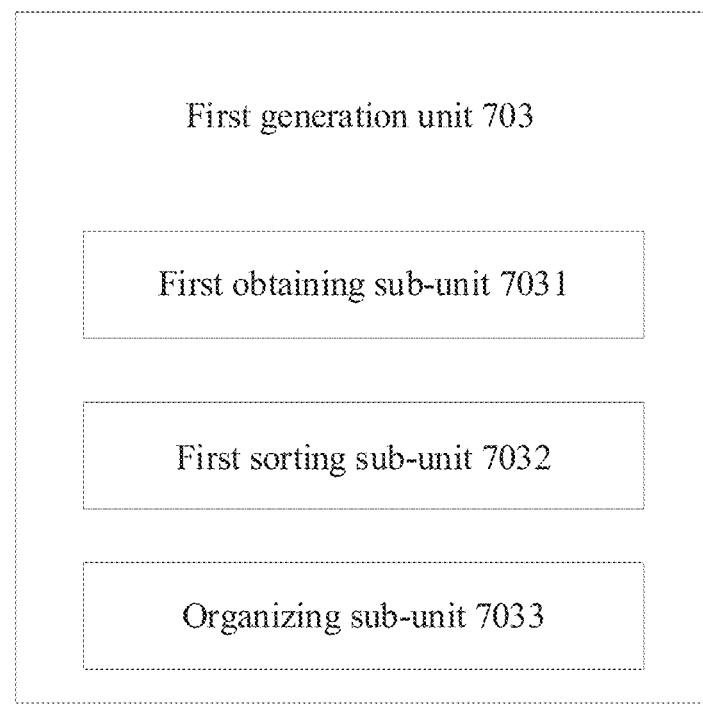
FIG. 9 shows a structural block diagram of a data search apparatus according to some embodiments of the present disclosure.

According to some embodiments, as shown in FIG. 9, the first generation unit 703 configured to generate, based on the at least one first data semantic vector, the search result further includes: a first obtaining sub-unit 7031 configured to obtain one or more first data corresponding to the at least one first data semantic vector; and a first sorting sub-unit 7032 configured to sort, based on a first sorting logic, the one or more first data, where the first sorting logic is based on at least one of the content quality, publishing time, or source credibility of the respective data. Thus, search results more in line with the user demands may be generated by focusing more on the relevance between the search result and the search request, and the user experience is improved.

Figure 10:
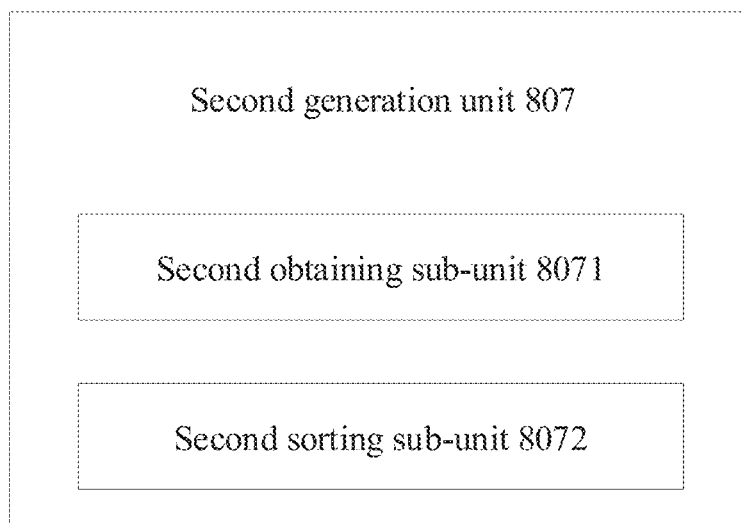
FIG. 10 shows a structural block diagram of a data search apparatus according to some embodiments of the present disclosure.

According to some embodiments, as shown in FIG. 10, the second generation unit 807 configured to generate, based on the at least one second data semantic vector, the recommendation result includes: a second obtaining sub-unit 8071 configured to obtain one or more second data corresponding to the at least one second data semantic vector; and a second sorting sub-unit 8072 configured to sort, based on a second sorting logic different from the first sorting logic, the one or more second data. The second sorting logic is based on a semantic relevance feature and a perception relevance feature of respective data. Thus, the recommendation result may be obtained by focusing more on the perception and interests of the user, thereby generating a recommendation result that focuses more on the perception of potential demands, and improving the user experience.

In the above two embodiments, the search result and the recommendation result are generated based on the different sorting logics. The first sorting logic focuses more on the semantic relevance, content quality, source reliability, etc. of data, and can obtain the search result that is more relevant to the direct search request of the user. Correspondingly, the second sorting logic focuses more on the perception of the potential demands of the user, and can obtain the recommendation result that is more in line with the perception and interests of the user, it can be understood that by using the two different sorting logics to generate the search result and the recommendation result respectively, the direct search demand and potential search demand of the user can be better met, and the user experience can be improved.

It can be understood that manners of organizing the one or more data is not limited to the simple stacking manner in the above example, and an appropriate organization manner may be designed according to specific application scenarios. For example, when the one or more data are text segments, the one or more data may be semantically understood, and a recommendation result is generated based on a semantic understanding result. For example, a text segment is configured to describe weather conditions of a certain place, including temperature, humidity, sunshine intensity, etc., and a recommendation result of "the place is suitable for outdoor activities" may be generated based on semantic understanding of the text segment.

According to some embodiments, as shown in FIG. 9, the first generation unit 703 configured to generate, based on the at least one first data semantic vector, the search result further includes: an organizing sub-unit 7033 configured to organize, based on an understanding of corresponding content, the one or more first data to generate the search result. Thus, the search result may be simplified to meet the user demands more accurately.

For example, when the search request input by the user is "food near scenic spot A", and the plurality of data include "menu of food B near scenic spot A", "business hours and address of food B near scenic spot A", "menu of food C near scenic spot A", "address of food C near scenic spot A", etc., the plurality of data above may be organized into "menu, business hours and address of food B near scenic spot A" and "menu and address of food C near scenic spot A" based on the understanding of the corresponding content, and displayed to the user, so as to provide the user with the search result that is more in line with the demands of the user, and improve user experience.

Figure 11:
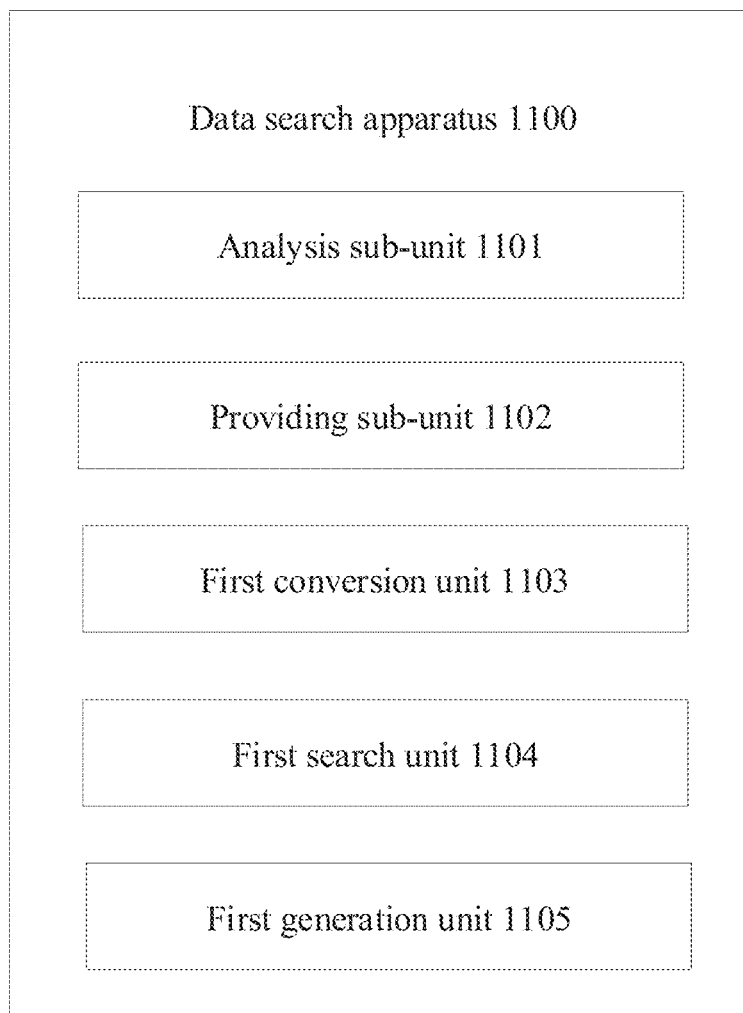
FIG. 11 shows a structural block diagram of a data search apparatus according to some embodiments of the present disclosure.

According to some embodiments, as shown in FIG. 11, the data search apparatus 1100 includes: an analysis sub-unit 1101 configured to perform structured analysis on the search request to determine whether there is ambiguity; and a providing sub-unit 1102 configured to provide, in response to determining that there is ambiguity, the user with content requiring clarification. The functions and implementations of units 1103 to 1105 are the same as those of the units 701 to 703 in FIG. 7, and will not be described in detail here. Thus, clarification of the search request of the user and guidance of the user demands may be achieved.

Whether the search request is clear and has no ambiguity may be determined by performing structured analysis on the search request. Structured analysis may be implemented, for example, based on knowledge graphs.

Referring to the example in FIG. 6, structured analysis is performed on the search information "hairstyle" input by the user, and comprehensive computer reasoning is performed in combination with a knowledge graph based on big data, so as to obtain the content requiring clarification for the user. It can be concluded that the "hairstyle" input by the user may have ambiguities from multiple angles, such as male hairstyle or female hairstyle, short hairstyle or long hairstyle, hairstyle for a long face or hairstyle for a round face, etc. By providing the user with the content requiring clarification, the user demands may be further determined and guided.

Figure 12:
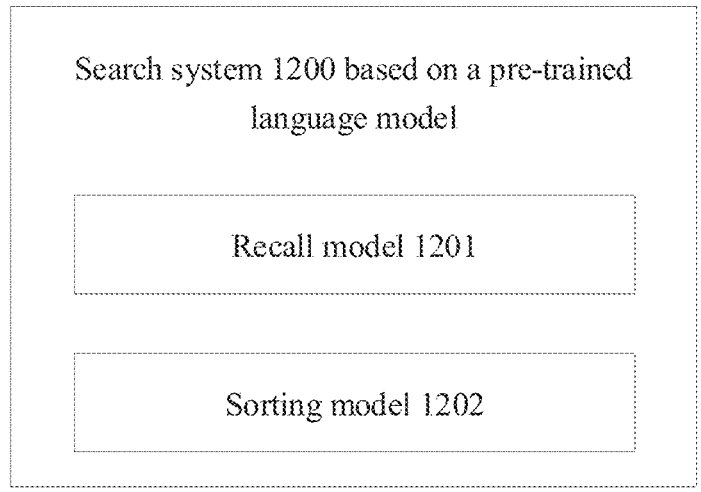
FIG. 12 shows a structural block diagram of a search system based on a pre-trained language model according to some embodiments of the present disclosure.

According to yet another aspect of the present disclosure, as shown in FIG. 12, a search system 1200 based on a pre-trained language model is provided. The search system includes: a recall model 1201, configured to convert a search request of a user into a first request semantic vector, and search a search resource database for at least one first data semantic vector matched with the first request semantic vector, and a sorting model 1202, configured to determine a similarity between the search request and one or more first data corresponding to the at least one first data semantic vector sequentially so as to sort the one or more first data. The recall model and the sorting model are cascaded to form an end-to-end deep neural network basic model. Thus, unified retrieval of data of different types and different structures may be achieved, the diversity of search results may be improved, and user experience may be improved.

Figure 15:
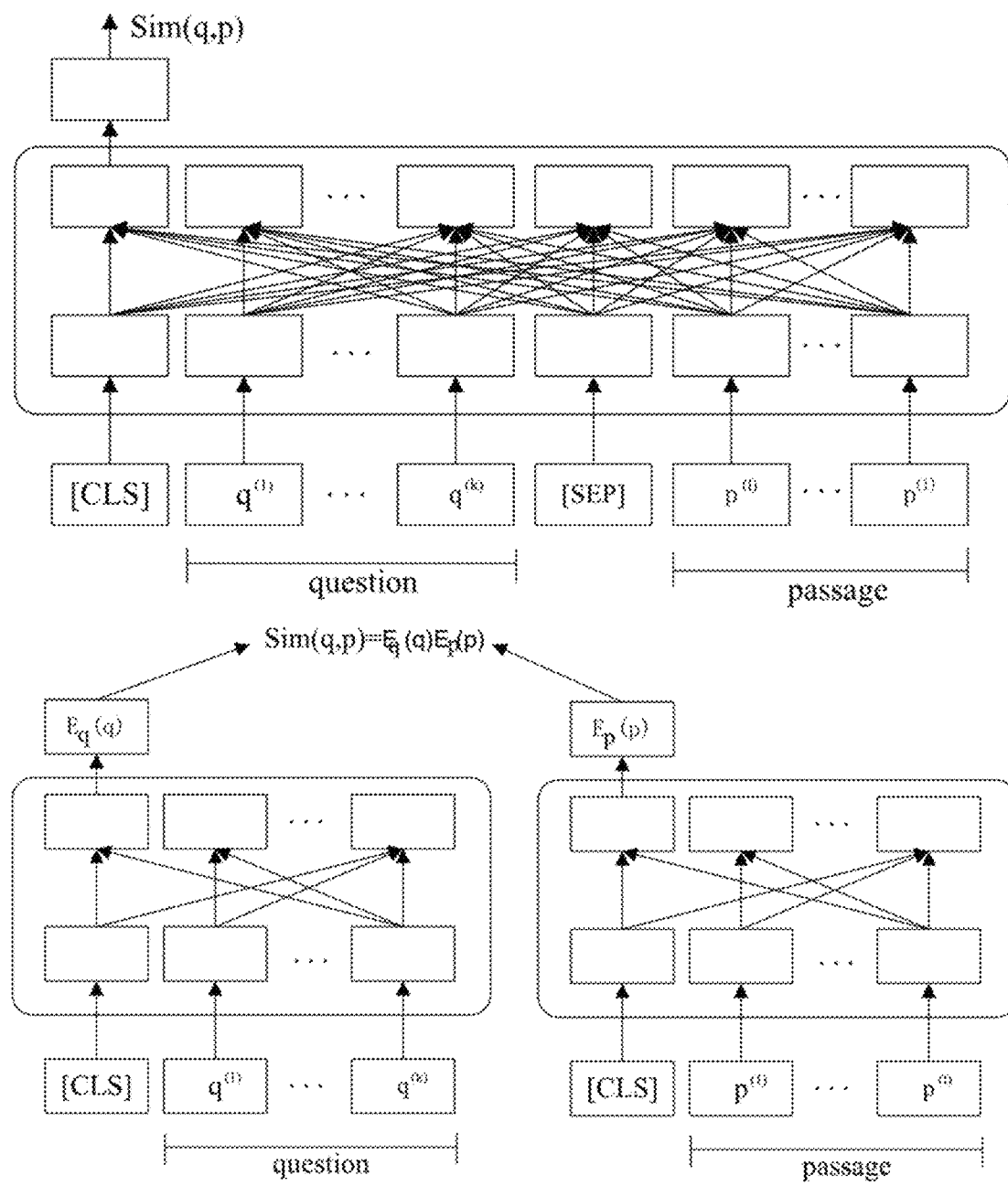
FIG. 15 shows a schematic structural diagram of a model constructed based on cross encoders and a schematic structural diagram of a model constructed based on dual encoders according to some embodiments of the present disclosure.

Exemplarily, the recall model may be constructed based on dual encoders, and the sorting model may be constructed based on cross encoders. Referring to FIG. 15, a schematic structural diagram of the model constructed based on cross encoders and a schematic structural diagram of the model constructed based on dual encoders are shown. A question sentence (i.e. the search request input by the user) and a passage sentence (i.e. data in the search resource database) are input into the recall model constructed based on the dual encoders. The two sentences are transmitted into two independent encoding networks, and the two encoding networks may be the same network. The two encoding networks output semantic vectors $E_q(q)$ and $E_p(p)$ corresponding to the two sentences respectively, so that similarity calculation may be performed based on the semantic vectors. One or more passage sentences matched with the question sentence are obtained based on the similarity.

The question sentence and the one or more passage sentences recalled by the recall model are input into a recommendation model constructed based on cross encoders, and similarity scores between the question sentence and the one or more passage sentences are output. The one or more passage sentences are sorted based on the similarity scores. Corresponding semantic vectors of the question sentence and the one or more recalled passage sentences are input into the recommendation model.

It can be understood that the above model structures are merely examples of the structures of the recall model and the sorting model of the present disclosure, and the recall model and the sorting model may also be models constructed based on other structures.

Exemplarily, the search resource database includes a large quantity of texts, pictures, videos and other different types of data. The different types of data may be obtained in various ways, such as accessing an existing database with standardized data content, where the data content is converted into corresponding data semantic vectors in the semantic vector space of the search resource database.

The search request of the user at least includes search information input by the user, and the search information may be, but not limited to, text information or voice information. Data that meet the requirements of the user are obtained by extracting semantic features of the search information and converting the semantic features into the first request semantic vector for matching search.

According to some embodiments, in the search resource database, the data semantic vectors converted from the different types of data have a uniform specification. Thus, unified retrieval of different types of data may be achieved.

It can be understood that the first request semantic vector has the same specification as data semantic vectors in the search resource database. For example, when the data semantic vectors in the search resource database are 1000-dimensional vectors, the search request should also be converted to the same specification, namely, a 1000-dimensional vector in the same mapping manner. Exemplarily, the similarity between the first request semantic vector and each data semantic vector in the search resource database may be calculated, and at least one first data semantic vector matched with the first request semantic vector is obtained based on the similarity. Based on the at least one first data semantic vector, first data corresponding to each first data semantic vector may be obtained, and then a search result may be generated based on the at least one first data and displayed to the user. The similarity between vectors may be, for example, but not limited to, cosine similarity.

According to some embodiments, in addition to the texts, pictures and videos, the different types of data at least include tables and knowledge graphs. It can be understood that the different types of data may further include other types of data, such as maps and animations. The search resource database may be further enriched by more types of data, thereby further improving the diversity of search results, better meeting user demands, and improving user experience.

According to some embodiments, at least one text or video datum among the different types of data is obtained by performing fine-grained division on original complete data. Thus, a deeper understanding of data content may be achieved, and then fine-grained indexing may be achieved to obtain search results that are more in line with user demands.

Exemplarily, obtaining at least one text or video datum by performing fine-grained division on the original complete data may be to perform fine-grained division on the original complete data according to semantics. In some embodiments, the fine-grained division of the original complete data may include semantic segmentation of the original complete data to obtain at least one text or video datum. Taking webpage text data as an example, original complete webpage text data may include a plurality of paragraphs, and each paragraph may have different semantic features, such that data semantic vectors corresponding to the complete web text data may not fully express different semantic features of each paragraph, which makes it impossible to match the first request semantic vector reflecting the user demands with the semantics of each paragraph in the search process. By dividing the original complete webpage text data, the data may be divided into a plurality of segments with different semantic features, and each segment corresponds to one of the at least one text. Each segment is converted into a corresponding data semantic vector, such that each segment may be subjected to matching with the first request semantic vector reflecting the user demands in the search process to obtain a search result that better meets the user demands. Similarly, fine-grained division may be performed based on video text data corresponding to a video, and the specific principle and process are similar to the webpage text data.

According to some embodiments, each data semantic vector in the semantic vector space includes a dimension relevant to content quality of respective data. The dimension relevant to the content quality of the respective data may be, but not limited to, a content quality score of the respective data. Thus, the quality of the search result may be improved by considering the content quality of data in the search process.

According to some embodiments, each data semantic vector in the semantic vector space includes a dimension relevant to publishing time of the respective data. The dimension relevant to the publishing time of the respective data may be, but not limited to, publishing time of the respective data. Thus, the quality of the search result may be improved by considering the timeliness of data in the search process.

According to some embodiments, each data semantic vector in the semantic vector space includes a dimension relevant to source credibility of the respective data. The dimension relevant to the source credibility of the respective data may be, but not limited to, the type of a source website of the respective data and credibility corresponding to the website type. Thus, the quality of the search result may be improved by considering the authority of data in the search process.

According to some embodiments, each data semantic vector in the semantic vector space includes at least two of the following dimensions of respective data: the dimension relevant to the content quality, the dimension relevant to the publishing time, and the dimension relevant to the source credibility. In the search process, the quality of the search result may be further improved by adding dimensions of data.

Based on the same principle, according to some embodiments, the first request semantic vector includes contextual information relevant to a search of the user, and the contextual information includes at least one of time, location, a terminal device, or a preceding search of the user. Thus, the accuracy of the search may be further improved.

It can be understood that direct search demands of the user may be described more accurately according to the contextual information relevant to the search of the user. For example, when the search information input by the user is "how is the weather tomorrow", the first request semantic vector may correspondingly include the location of the user, for example, Beijing, so as to provide the user with a relevant search result about "the weather in Beijing tomorrow", thereby meeting the user demands more accurately and improving user experience.

Figure 13:
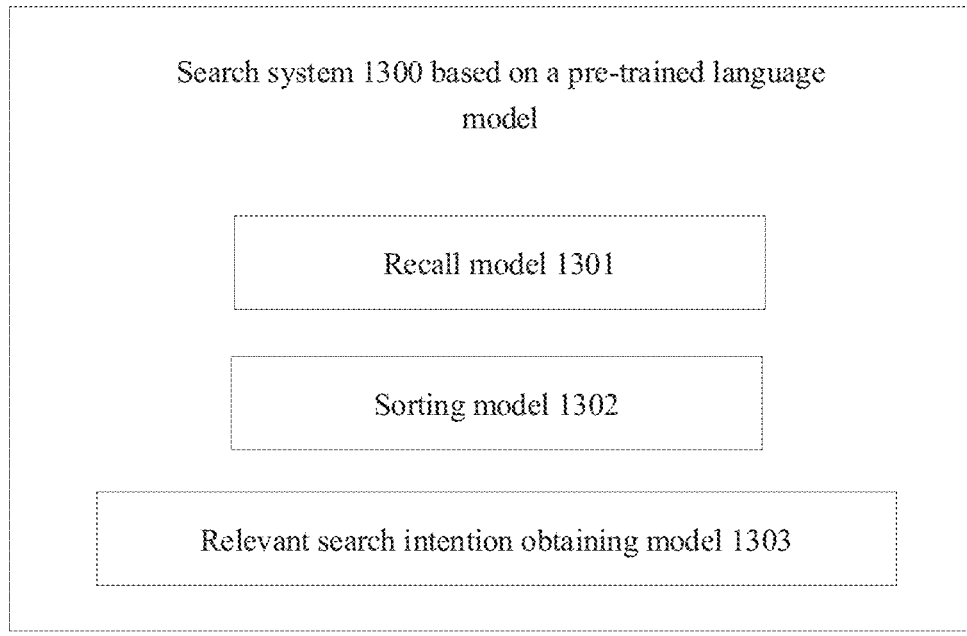
FIG. 13 shows a structural block diagram of a search system based on a pre-trained language model according to some embodiments of the present disclosure.

According to some embodiments, as shown in FIG. 13, the search system further includes: a relevant search intention obtaining model 1303, configured to obtain, based on the input search request, a relevant search intention of the user.

According to some embodiments, in the search system as shown in FIG. 13, the recall model 1301 is further configured to: convert the relevant search intention into a second request semantic vector; and search the search resource database for at least one second data semantic vector matched with the second request semantic vector.

Thus, in response to the search request of the user, a query result may further meet extended demands of the user by obtaining the relevant search intention of the user and performing search and recommendation based on the relevant search intention, thereby further improving the user experience. There may be one or more potential extended intentions.

According to some embodiments, each second data semantic vector in the at least one second data semantic vector includes dimensions relevant to the semantic relevance feature and the perception relevance feature of the respective data respectively. The semantic relevance feature is configured to describe direct semantics of the respective data, and the perception relevance feature focuses on dimensions relevant to user demands and interests, thereby further improving the accuracy of a recommendation system and better meeting potential demands of the user.

According to some embodiments, the second request semantic vector includes dimensions relevant to a semantic relevance feature and a perception relevance feature of the search request respectively. The semantic relevance feature is configured to describe direct semantics of the respective data, and the perception relevance feature focuses on dimensions relevant to user demands and interests, thereby further improving the accuracy of a recommendation system and better meeting potential demands of the user.

For example, the semantic relevance feature dimension in a data semantic vector corresponding to a webpage containing the introduction of public figure A is configured to describe direct semantics of content of the webpage. The perception relevance feature dimension in the data semantic vector corresponding to the webpage focuses on describing possible extended interests of the user around public figure A. For example, the user may be interested in who the wife of public figure A is, what works public figure A has, etc., and corresponding content may be included in the perception relevance feature dimension. Thus, the accuracy of the recommendation system may be further improved, and the potential demands of the user may be better met.

According to some embodiments, a plurality of first data semantic vectors configured to recall the search request of the user and a plurality of second data semantic vectors configured to recall the relevant search intention of the user may be completely identical, or partially identical, or completely different. That is, a plurality of first data corresponding to the plurality of first data semantic vectors and a plurality of second data corresponding to the plurality of second data semantic vectors may be completely identical, or partially identical, or completely different. The one or more first data matched with the search request of the user are obtained by recalling from the plurality of first data, and the one or more second data matched with the relevant search intention of the user are obtained by recalling from the plurality of second data.

In some embodiments, the amount of the plurality of second data is smaller than the amount of the plurality of first data, thereby achieving accurate recommendation, improving a recommendation effect, and further improving the user experience.

According to some embodiments, the search resource database includes a first sub-base, and a second sub-base only used for the relevant search intention, and an amount of data in the second sub-base is smaller than an amount of data in the first sub-base. By setting the two sub-bases, search and recommendation may be more pertinent. The first sub-base is configured to meet a large number of recall demands for relevance searches, and the second sub-base is configured to meet accurate recall demands of potential demands of the user. Thus, the quality of query results may be better improved, and the user experience may be further improved.

Exemplarily, the amount of data in the first sub-base may be in the order of tens of billions or hundreds of billions, so that more content resources may be covered, and content demands of the user may be more comprehensively covered. Correspondingly, the amount of data in the second sub-base may be in the order of millions.

It can be understood that the data in the second sub-base used for recommendation may be selected according to a predetermined quality standard, so as to provide users with higher-quality recommended content, better meet extended demands of the user, and improve user experience.

Figure 14:
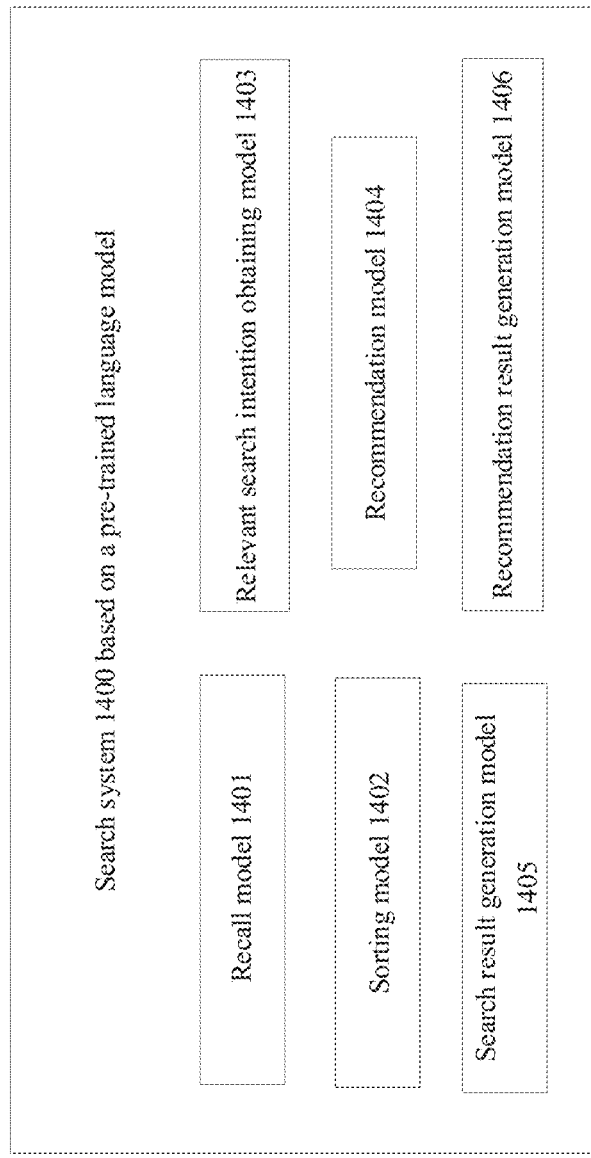
FIG. 14 shows a structural block diagram of a search system based on a pre-trained language model according to some embodiments of the present disclosure.

According to some embodiments, as shown in FIG. 14, the search system 1400 based on the pre-trained language model further includes: a recommendation model 1404, configured to determine a similarity between the relevant search intention and one or more second data corresponding to the at least one second data semantic, vector sequentially so as to sort the one or more second data.

According to some embodiments, as shown in FIG. 14, the search system 1400 based on the pre-trained language model further includes: a search result generation model 1405, configured to organize, based on an understanding of corresponding content, the one or more first data to generate a search result. Thus, the search result may be simplified to meet the user demands more accurately.

For example, when the search request input by the user is "food near scenic spot A", and the plurality of data include "menu of food B near scenic spot A", "business hours and address of food B near scenic spot A", "menu of food C near scenic spot A", "address of food C near scenic spot A", etc., the plurality of data above may be organized into "menu, business hours and address of food B near scenic spot A" and "menu and address of food C near scenic spot A" based on the understanding of the corresponding content, and displayed to the user, so as to provide the user with the search result that is more in line with the demands of the user, and improve user experience.

It can be understood that manners of organizing the one or more data is not limited to the simple stacking manner in the above example, and an appropriate organization manner may be designed according to specific application scenarios. For example, when the one or more data are text segments, the one or more data may be semantically understood, and a recommendation result is generated based on a semantic understanding result. For example, a text segment is configured to describe weather conditions of a certain place, including temperature, humidity, sunshine intensity, etc., and a recommendation result of "the place is suitable for outdoor activities" may be generated based on semantic understanding of the text segment.

According to some embodiments, as shown in FIG. 14, the search system 1400 based on the pre-trained language model further includes: a recommendation result generation model 1406, configured to organize, based on an understanding of corresponding content, the one or more second data to generate a recommendation result. Thus, the recommendation result may be simplified to meet the user demands more accurately.

According to some embodiments, the search system further includes: an ambiguity elimination model, configured to: perform structured analysis on the search request to determine whether there is ambiguity; and provide, in response to determining that there is ambiguity, the user with content requiring clarification. Thus, clarification of the search request of the user and guidance of the user demands may be achieved. Whether the search request is clear and has no ambiguity may be determined by performing structured analysis on the search request. Structured analysis may be implemented, for example, based on knowledge graphs.

Figure 16:
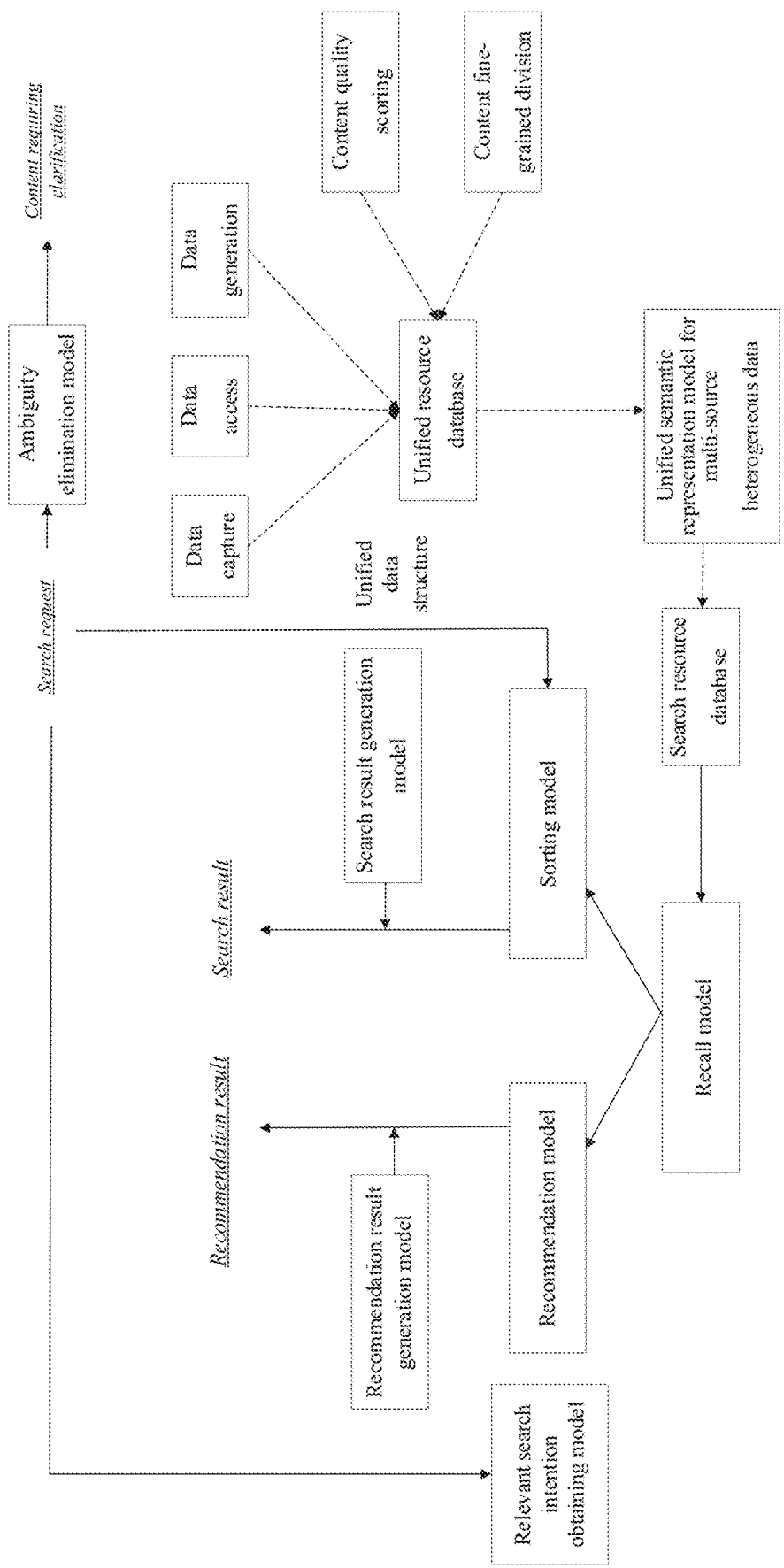
FIG. 16 shows a schematic diagram of a working process of a search system based on a pre-trained language model according to some embodiments of the present disclosure.

FIG. 16 shows a schematic diagram of a working process of a search system based on a pre-trained language model according to some embodiments of the present disclosure. The arrows show the direction of signal flow, the solid arrows show the working process of online search and recommendation, and the dashed arrows show the working process of building a unified resource database.

Before describing the working process of the search system, the building of the databases used by the search system is described first.

Referring to FIG. 16, data in the unified resource database may be obtained by means of data capture, data access, data generation, etc. Data capture may be specifically a manner of using a computer program to automatically extract webpage data. Data access may be specifically a manner of accessing an existing database. Data generation may be specifically a manner of instructing production and access of third-party content based on the search demands of the user. The data obtained in various manners are converted into a unified data format, and then stored in the unified resource database for subsequent processing.

The unified data structure corresponding to the data of the unified resource database may be composed of, for example, a key-value tuple, where key is an attribute of the data, and value is a value of the data. The key-value tuple may include a public type and a special type. The key-value tuple of the public type may cover attributes common to data of different types and sources, such as title, abstract, uniform resource locator (URL), and time. The key-value tuple of the special type may cover attributes unique to data of different types and sources, for example, video type data may include resolution attributes and so on.

The data of different types and sources may be converted into data semantic vectors with a unified specification via a unified semantic representation model of multi-source heterogeneous data, and stored in the search resource database.

Data corresponding to each data semantic vector may be obtained from the uniform resource database. For example, a unique identifier may be set for each datum, the search resource database may store the correspondence between each data semantic vector and the unique identifier of the respective data, and the unified resource database may store the correspondence between each data and the corresponding unique identifier. Thus, association between the unified resource database and the search resource database may be achieved, and one or more corresponding data may be obtained based on at least one data semantic vector matched with the search request.

According to some embodiments, each data in the uniform resource database may be scored for the content quality via a content quality scoring model, such that a dimension of content quality scoring information may be added for the data, and stored in the uniform resource database. Correspondingly, dimensions of information such as publishing time and source reliability may also be added for each data, and stored in the unified resource database.

According to some embodiments, fine-grained division may be performed on the original complete data according to semantics by using a content fine-grained division model, and the data in the unified resource database are fine-grained divided data. For example, webpage text data containing a plurality of paragraphs may be divided into a plurality of text segments with different semantic features based on semantic understanding, and the plurality of text segments are respectively stored in the unified resource database. Further, each text segment may be converted into a corresponding data semantic vector via the unified semantic representation model for multi-source heterogeneous data, and stored in the search resource database.

Continuing to refer to FIG. 16, the working process of the search system is as follows:

Step S11, in response to the search request input by the user, structured analysis may be performed on the search request via the ambiguity elimination model to determine whether there is ambiguity, such that the user may be provided with the content requiring clarification, and clarification of the search request of the user and guidance on the user demands are achieved.

The search request may specifically include search information input by the user and contextual information relevant to the search information. The contextual information relevant to the search information may include, for example, time, location, device, a preceding search of the user, etc.

Step S12, the search request of the user is converted into the first request semantic vector by using the unified semantic representation model for multi-source heterogeneous data, and the search resource database is searched for the at least one first data semantic vector matched with the first request semantic vector by using the recall model.

Specifically, the at least one first data semantic vector matched with the first request semantic vector may be obtained by calculating the similarities between the first request semantic vector and the data semantic vectors in the search resource database.

Step S13, the one or more first data corresponding to the at least one first data semantic vector are obtained from the unified resource database.

Step S14, the one or more first data and the search request input by the user are input into the sorting model to calculate similarity scores between the one or more first data and the search request, and the one or more first data are sorted based on the similarity scores.

The one or more first data and the search request may include at least one of the following dimensions: semantic relevance, content quality, authority, etc.

Step S15, the search result is generated based on the one or more first data by using the search result generation model.

The search result generation model may organize, based on the understanding of corresponding content, the first data to generate the search result.

Step S16, the relevant search intention of the user is obtained based on the search request by using the relevant search intention obtaining model.

Step S17, the relevant search intention of the user is converted into the second request semantic vector by using the unified semantic representation model for multi-source heterogeneous data, and the search resource database is searched for the at least one second data semantic vector matched with the second request semantic vector by using the recall model.

Specifically, the at least one second data semantic vector matched with the second request semantic vector may be obtained by calculating the similarities between the second request semantic vector and the data semantic vectors in the search resource database.

A recall model used for recommendation and the recall model used for searching may be the same model, or different models constructed with different recall logics.

Step S18, the one or more second data corresponding to the at least one second data semantic vector are obtained from the unified resource database.

Step S19, the one or more second data and the relevant search intention corresponding to the search request input by the user are input into the recommendation model to calculate similarity scores between the one or more second data and the relevant search intention, and the one or more second data are sorted based on the similarity scores.

A sorting logic of the recommendation model may be based on a plurality of dimensions such as semantic relevance and perception relevance of respective data. The perception relevance dimension focuses more on the perception of potential demands and interests of the user, such that the search result more in line with the user demands and interests may be generated.

Step S20, the recommendation result is generated based on the one or more second data by using the recommendation result generation model.

According to another aspect of the present disclosure, a training method for a search system based on a pre-trained language model is further provided. The search system includes an end-to-end deep neural network basic model formed by cascading a recall model and a sorting model. The recall model is constructed based on dual encoders, and the sorting model is constructed based on cross encoders.

Figure 17:
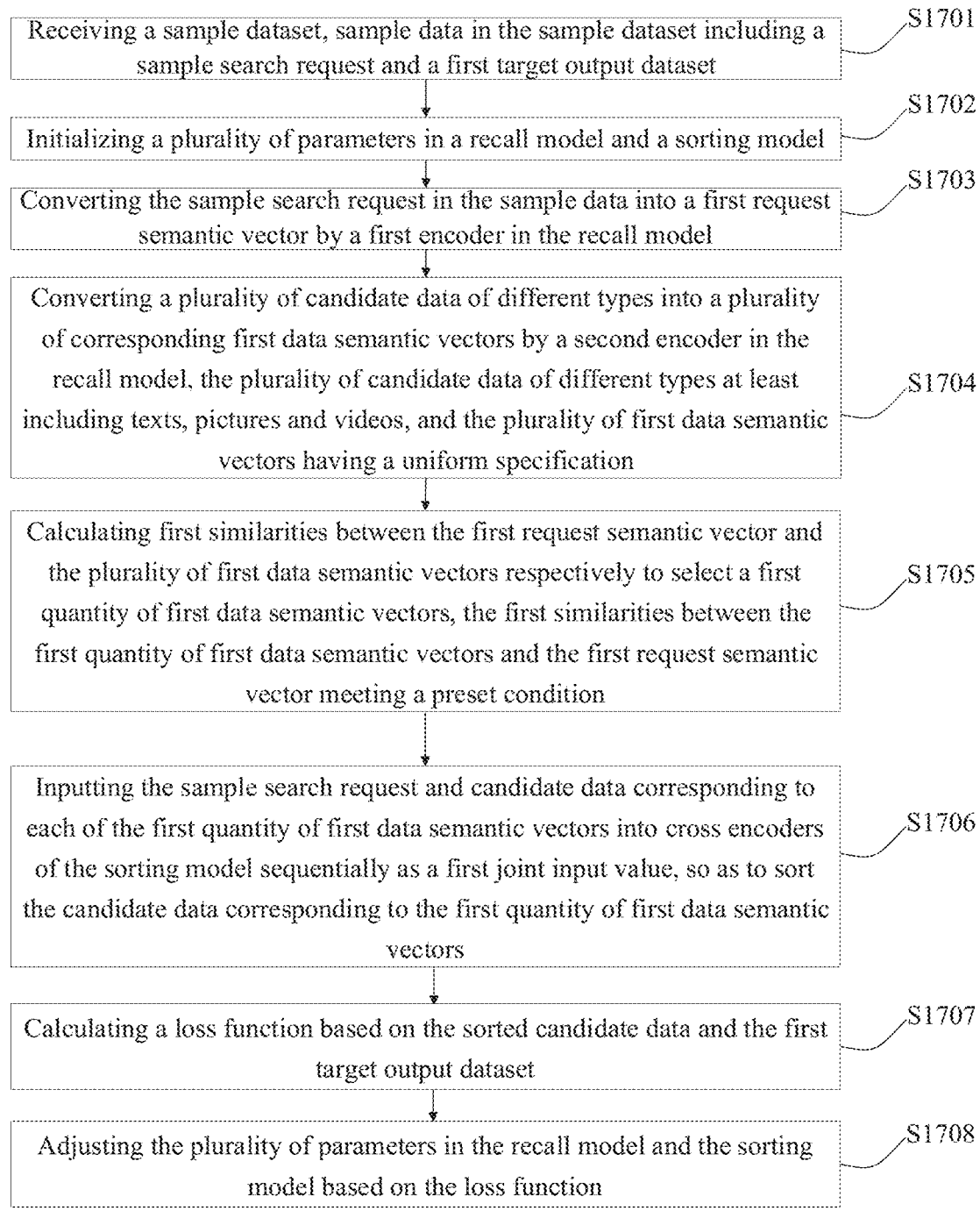
FIG. 17 shows a flow diagram of a training method for a search system based on a pre-trained language model according to some embodiments of the present disclosure.

FIG. 17 shows the training method of the search system based on the pre-trained language model according to some embodiments of the present disclosure. As shown in FIG. 17, the method includes: step S1701, a sample dataset is received, sample data in the sample dataset including a sample search request and a first target output dataset; and step S1702, a plurality of parameters in the recall model and the sorting model are initialized. The following operations are executed on each sample datum: step S1703, the sample search request in the sample data is converted into a first request semantic vector by a first encoder in the recall model; step S1704, a plurality of candidate data of different types are converted into a plurality of corresponding first data semantic vectors by a second encoder in the recall model, the plurality of candidate data of different types at least including texts, pictures and videos, and the plurality of first data semantic vectors having a uniform specification; step S1705, first similarities between the first request semantic vector and the plurality of first data semantic vectors are calculated respectively to select a first quantity of first data semantic vectors, the first similarities between the first quantity of first data semantic vectors and the first request semantic vector meeting a preset condition; step S1706, the sample search request and candidate data corresponding to each of the first quantity of first data semantic vectors are input into the cross encoders of the sorting model sequentially as a first joint input value, so as to sort the candidate data corresponding to the first quantity of first data semantic vectors; step S1707, a loss function is calculated based on the sorted candidate data and the first target output dataset;

and step S1708, the plurality of parameters in the recall model and the sorting model are adjusted based on the loss function. The similarity between vectors may be, for example, but not limited to, cosine similarity.

According to some embodiments, in addition to the texts, pictures and videos, the plurality of candidate data of different types at least include tables and knowledge graphs. It can be understood that the different types of data may further include other types of data, such as maps and animations. The search resource database may be further enriched by more types of data, thereby further improving the diversity of search results, better meeting user demands, and improving user experience.

According to some embodiments, at least one text or video datum among the plurality of candidate data of different types is obtained by performing fine-grained division on original complete data. Thus, a deeper understanding of data content may be achieved, and then fine-grained indexing may be achieved to obtain search results that are more in line with user demands.

Exemplarily, obtaining at least one text or video datum by performing fine-grained division on the original complete data may be to perform fine-grained division on the original complete data according to semantics. In some embodiments, the fine-grained division of the original complete data may include semantic segmentation of the original complete data to obtain at least one text or video datum. Taking webpage text data as an example, original complete webpage text data may include a plurality of paragraphs, and each paragraph may have different semantic features, such that data semantic vectors corresponding to the complete web text data may not fully express different semantic features of each paragraph, which makes it impossible to match the first request semantic vector reflecting the user demands with the semantics of each paragraph in the search process. By dividing the original complete webpage text data, the data may be divided into a plurality of segments with different semantic features, and each segment corresponds to one of the at least one text. Each segment is converted into a corresponding data semantic vector, such that each segment may be subjected to matching with the first request semantic vector reflecting the user demands in the search process to obtain a search result that better meets the user demands. Similarly, fine-grained division may be performed based on video text data corresponding to a video, and the specific principle and process are similar to the webpage text data.

According to some embodiments, each data semantic vector in the plurality of first data semantic vectors includes a dimension relevant to content quality of corresponding candidate data. The dimension relevant to the content quality of the respective data may be, but not limited to, a content quality score of the respective data. Thus, the search system trained by using the method may further consider the content quality of data, thereby improving the quality of the search result.

According to some embodiments, each data semantic vector in the plurality of first data semantic vectors includes a dimension relevant to publishing time of the corresponding candidate data. The dimension relevant to the publishing time of the respective data may be, but not limited to, publishing time of the respective data. Thus, the search system trained by using the method may further consider the timeliness of data, thereby improving the quality of the search result.

According to some embodiments, each data semantic vector in the plurality of first data semantic vectors includes a dimension relevant to source credibility of the corresponding candidate data. The dimension relevant to the source credibility of the respective data may be, but not limited to, the type of a source website of the respective data and credibility corresponding to the website type. Thus, the search system trained by using the method may further consider the authority of data, thereby improving the quality of the search result.

According to some embodiments, each data semantic vector in the semantic vector space includes at least two of the following dimensions of respective data: the dimension relevant to the content quality, the dimension relevant to the publishing time, and the dimension relevant to the source credibility. In the search process, the quality of the search result may be further improved by adding dimensions of data.

Based on the same principle, according to some embodiments, the first request semantic vector includes contextual information relevant to a search of a user, and the contextual information includes at least one of time, location, or a preceding search of the user. Thus, the search accuracy of the search system trained by using the method may be further improved.

It can be understood that direct search demands of the user may be described more accurately according to the contextual information relevant to the search of the user. For example, when the search information input by the user is "how is the weather tomorrow", the first request semantic vector may correspondingly include the location of the user, for example, Beijing, so as to provide the user with a relevant search result about "the weather in Beijing tomorrow", thereby meeting the user demands more accurately and improving user experience.

According to some embodiments, the first joint input value includes at least one of the content quality, publishing time, or source credibility of the corresponding candidate data. Thus, the content quality, publishing time, source reliability, etc. of the candidate data may be fully considered in the soiling process, so as to obtain a sorting result of higher quality, such that the search system trained by using the method may generate the search result that is more in line with the user demands, and the user experience is improved.

According to some embodiments, the system further includes a recommendation model. The sample data in the sample dataset further include a second target output dataset. The training method further includes: a plurality of parameters in the recommendation model are initialized. The following operation is performed on each sample datum: the sample search request and the candidate data corresponding to each of the first quantity of first data semantic vectors are input into cross encoders of the recommendation model sequentially as a second joint input value, so as to sort the candidate data corresponding to the first quantity of first data semantic vectors; a loss function is calculated based on the sorted candidate data and the second target output dataset; and the plurality of parameters in the recall model, the soiling model and the recommendation model are adjusted based on the loss function.

According to some embodiments, the second joint input value includes a semantic relevance feature and a perception relevance feature of the corresponding candidate data. The semantic relevance feature is configured to describe direct semantics of the candidate data, and the perception relevance feature focuses on dimensions relevant to user demands and interests.

Thus, the accuracy of the recommendation model trained by the method may be further improved, and potential demands of the user may be better met.

For example, the semantic relevance feature dimension in a data semantic vector corresponding to a webpage containing the introduction of public figure A is configured to describe direct semantics of content of the webpage. The perception relevance feature dimension in the data semantic vector corresponding to the webpage focuses on describing possible extended interests of the user around public figure A. For example, the user may be interested in who the wife of public figure A is, what works public figure A has, etc., and corresponding content may be included in the perception relevance feature dimension. Thus, the accuracy of the search system trained by the method may be further improved, and potential demands of the user may be better met.

According to yet another aspect of the present disclosure, an computing device is further provided. The computing device includes: one or more processors; and a memory storing one or more programs configured to be executed by the one or more processors, the one or more programs comprising instructions for performing operations comprising: converting a search request of a user into a first request semantic vector; searching a search resource database for at least one first data semantic vector matched with the first request semantic vector, wherein the search resource database is constructed as a semantic vector space in which different types of data are converted into corresponding data semantic vectors, and wherein the different types of data at least comprise texts, pictures and videos; and generating, based on the at least one first data semantic vector, a search result.

According to yet another aspect of the present disclosure, a non-transitory computer-readable storage medium storing computer instructions is further provided. The computer instructions are configured to enable a computer to execute the above search method or the training method of the search system based on the pre-trained language model.

According to yet another aspect of the present disclosure, a computer program product is further provided. The computer program product includes a computer program. The non-transitory computer-readable storage medium storing one or more programs comprising instructions that, when executed by one or more processors of a computing device, cause the computing device to perform operations comprising: converting a search request of a user into a first request semantic vector; searching a search resource database for at least one first data semantic vector matched with the first request semantic vector, wherein the search resource database is constructed as a semantic vector space in which different types of data are converted into corresponding data semantic vectors, and wherein the different types of data at least comprise texts, pictures and videos; and generating, based on the at least one first data semantic vector, a search result.

Figure 18:
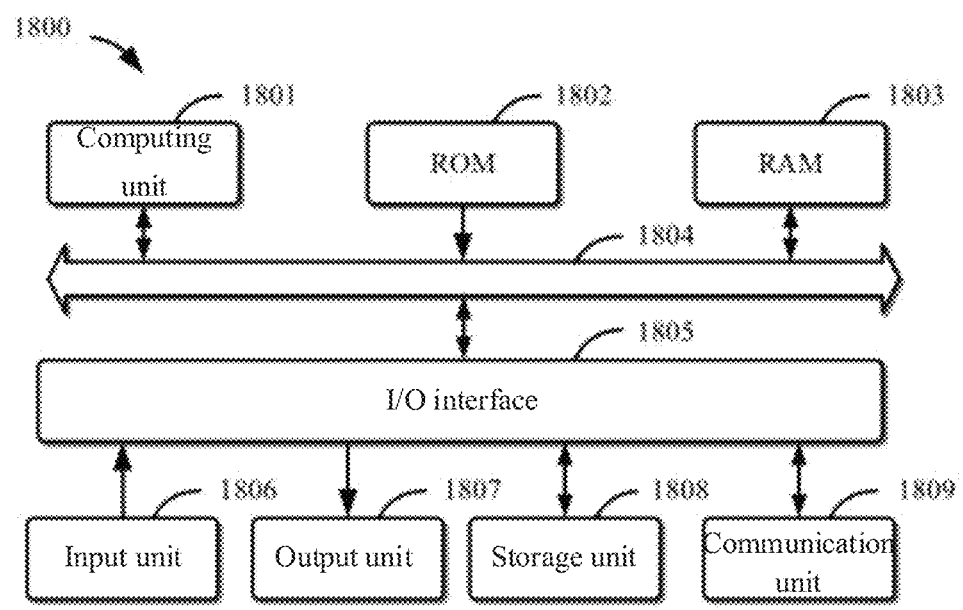
FIG. 18 shows a structural block diagram of a computing device that can be configured to implement embodiments of the present disclosure.

Referring to FIG. 18, a structural block diagram of an computing device 1800 that may serve as a server or a client of the present disclosure will now be described, and the computing device is an example of a hardware device that may be applied to various aspects of the present disclosure. The computing device is intended to represent various forms of digital electronic computer devices, such as a laptop computer, a desktop computer, a workstation, a personal digital assistant, a server, a blade server, a mainframe computer, and other suitable computers. The computing device may further represent various forms of mobile apparatuses, such as a personal digital processing equipment, a cell phone, a smart phone, a wearable device and other similar computing apparatuses. The components shown herein, their connections and relationships, and their functions are merely used as examples, and are not intended to limit the implementations of the present disclosure described and/or required herein.

As shown in FIG. 18, the device 1800 includes a computing unit 1801 that may perform various appropriate actions and processing according to computer programs stored in a read-only memory (ROM) 1802 or computer programs loaded from a storage unit 1808 into a random access memory (RAM) 1803. Various programs and data required for operations of the device 1800 may further be stored in the RAM 1803. The computing unit 1801, the ROM 1802 and the RAM 1803 are connected to each other via a bus 1804. An input/output (I/O) interface 1805 is also connected to the bus 1804.

A plurality of components in the device 1800 are connected to the I/O interface 1805, including: an input unit 1806, an output unit 1807, a storage unit 1808, and a communication unit 1809. The input unit 1806 may be any type of device capable of inputting information to the device 1800. The input unit 1806 may receive input digital or character information and generate key signal input related to user settings and/or function control of the computing device, and may include but not limited to a mouse, a keyboard, a touch screen, a trackpad, a trackball, a joystick, a microphone and/or a remote control. The output unit 1807 may be any type of device capable of presenting information, and may include but not limited to a display, a speaker, a video/audio output terminal, a vibrator and/or a printer. The storage unit 1808 may include but not limited to a magnetic disk and a compact disk. The communication unit 1809 allows the device 1800 to exchange information/data with other devices via computer networks such as the Internet and/or various telecommunication networks, and may include but not limited to a modem, a network card, an infrared communication device, a wireless communication transceiver and/or a chipset, such as a Bluetooth™ device, a 802.11 device, a WiFi device, a WiMax device, a cellular communication device and/or the like.

The computing unit 1801 may be various general-purpose and/or special-purpose processing components with processing and computing capabilities. Some examples of the computing unit 1801 include but not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 1801 executes various methods and processing described above, such as the above search method or the training method of the search system based on the pre-trained language model. For example, in some embodiments, the above search method or the training method of the search system based on the pre-trained language model may be implemented as a computer software program that is tangibly included in a machine-readable medium such as the storage unit 1808. In some embodiments, part or all of the computer programs may be loaded and/or installed onto the device 1800 via the ROM 1802 and/or the communication unit 1809. When the computer programs are loaded into the RAM 1803 and executed by the computing unit 1801, one or more steps of the above search method or the training method of the search system based on the pre-trained language model may be executed. Alternatively, in other embodiments, the computing unit 1801 may be configured to execute the above search method or the training method of the search system based on the pre-trained language model in any other suitable manner (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally far away from each other and usually interact via a communication network. The relationship between the client and the server is generated by computer programs running on the corresponding computer and having a client-server relationship with each other. The server may be a cloud server, or a server of a distributed system, or a server combined with a block chain.

It should be understood that the various forms of processes shown above may be configured to reorder, add, or delete steps. For example, the steps recorded in the present disclosure may be performed in parallel, sequentially or in different orders, as long as the desired results of the technical solution disclosed by the present disclosure can be achieved, which is not limited herein.

Although the embodiments or examples of the present disclosure have been described with reference to the accompanying drawings, it should be understood that the above methods, systems and devices are only exemplary embodiments or examples, and the scope of the present disclosure is not limited by these embodiments or examples, but only by the authorized claims and their equivalent scope. Various elements in the embodiments or examples may be omitted or replaced by their equivalent elements. In addition, the steps may be performed in an order different from that described in the present disclosure. Further, various elements in the embodiments or examples may be combined in various ways. It is important that as technology evolves, many of the elements described herein may be replaced by equivalent elements that appear after the present disclosure.

The invention claimed is:

1. A search method, comprising:
converting, by using a recall model, a search request of a user into a first request semantic vector;
searching, by using the recall model, a search resource database for at least one first data semantic vector matched with the first request semantic vector, wherein the search resource database is constructed as a semantic vector space in which different types of data are converted into corresponding data semantic vectors, and wherein the different types of data comprise at least texts, pictures and videos;
generating, based on the at least one first data semantic vector, a search result;
obtaining, by using a relevant search intention obtaining model, a relevant search intention of the user based on the search request of the user;
converting, by using the recall model, the relevant search intention into a second request semantic vector;

searching, by using the recall model, the search resource database for at least one second data semantic vector matched with the second request semantic vector, wherein the search resource database comprises a first sub-base, and a second sub-base only used for the relevant search intention, and wherein an amount of data in the second sub-base is smaller than an amount of data in the first sub-base; and generating, based on the at least one second data semantic vector, a recommendation result.

2. The method according to claim 1, wherein the obtaining the relevant search intention of the user comprises: obtaining, based on a demand graph, the relevant search intention of the user.

3. The method according to claim 1, wherein the obtaining the relevant search intention of the user comprises: obtaining, based on a search history of the user in the same session process, the relevant search intention of the user.

4. The method according to claim 1, wherein the data in the second sub-base are selected according to a predetermined quality standard.

5. The method according to claim 1, wherein the generating the search result comprises:

obtaining one or more first data corresponding to the at least one first data semantic vector; and sorting, based on a first sorting logic, the one or more first data, wherein the first sorting logic is based on at least one of a content quality, a publishing time, and a source credibility of the respective data.

6. The method according to claim 5, wherein the generating the recommendation result comprises:

obtaining one or more second data corresponding to the at least one second data semantic vector; and sorting, based on a second sorting logic different from the first sorting logic, the one or more second data, wherein the second sorting logic is based on a semantic relevance feature and a perception relevance feature of the respective data.

7. The method according to claim 5, wherein the generating the search result further comprises:

organizing, based on an understanding of a content of each of the one or more first data, the one or more first data to generate the search result.

8. The method according to claim 1, further comprising:

performing structured analysis on the search request to determine whether there is ambiguity; and providing, in response to determining that there is ambiguity, the user with a content requiring clarification.

9. The method according to claim 1, wherein each data semantic vector in the semantic vector space comprises a dimension relevant to a content quality of the respective data.

10. The method according to claim 1, wherein each data semantic vector in the semantic vector space comprises a dimension relevant to a publishing time of the respective data.

11. The method according to claim 1, wherein each data semantic vector in the semantic vector space comprises a dimension relevant to a source credibility of the respective data.

12. The method according to claim 1, wherein each second data semantic vector in the at least one second data semantic vector comprises dimensions relevant to the semantic relevance feature and a perception relevance feature of the respective data, respectively.

13. The method according to claim 1, wherein the first request semantic vector comprises contextual information relevant to a search of the user, and the contextual information comprises at least one of a time, a location, a terminal device, or at least one preceding search of the user.

14. The method according to claim 1, wherein a second request semantic vector comprises dimensions relevant to a semantic relevance feature and a perception relevance feature of the search request respectively.

15. The method according to claim 1, wherein the different types of data further comprise tables and knowledge graphs.

16. The method according to claim 1, wherein at least one text or video datum in the different types of data is obtained by performing fine-grained division on original complete data.

17. A computing device, comprising:

one or more processors; and a memory storing one or more programs configured to be executed by the one or more processors, the one or more programs comprising instructions for performing operations comprising:

converting, by using a recall model, a search request of a user into a first request semantic vector;

searching, by using a recall model, a search resource database for at least one first data semantic vector matched with the first request semantic vector, wherein the search resource database is constructed as a semantic vector space in which different types of data are converted into corresponding data semantic vectors, and wherein the different types of data comprise at least texts, pictures and videos;

generating, based on the at least one first data semantic vector, a search result;

obtaining, by using a relevant search intention obtaining model, a relevant search intention of the user based on the search request of the user;

converting, by using the recall model, the relevant search intention into a second request semantic vector;

searching, by using the recall model, the search resource database for at least one second data semantic vector matched with the second request semantic vector, wherein the search resource database comprises a first sub-base, and a second sub-base only used for the relevant search intention, and wherein an amount of data in the second sub-base is smaller than an amount of data in the first sub-base; and generating, based on the at least one second data semantic vector, a recommendation result.

18. A non-transitory computer-readable storage medium storing one or more programs comprising instructions that, when executed by one or more processors of a computing device, cause the computing device to perform operations comprising:

converting, by using a recall model, a search request of a user into a first request semantic vector;

searching, by using a recall model, a search resource database for at least one first data semantic vector matched with the first request semantic vector, wherein the search resource database is constructed as a semantic vector space in which different types of data are converted into corresponding data semantic vectors, and wherein the different types of data comprise at least texts, pictures and videos;

generating, based on the at least one first data semantic vector, a search result;

obtaining, by using a relevant search intention obtaining model, a relevant search intention of the user based on the search request of the user;

converting, by using the recall model, the relevant search intention into a second request semantic vector;

searching, by using the recall model, the search resource database for at least one second data semantic vector matched with the second request semantic vector, wherein the search resource database comprises a first sub-base, and a second sub-base only used for the relevant search intention, and wherein an amount of data in the second sub-base is smaller than an amount of data in the first sub-base; and generating, based on the at least one second data semantic vector, a recommendation result.

\* \* \* \* \*